US012720229B2

(12) United States Patent
Evans et al.

(10) Patent No.: US 12,720,229 B2
(45) Date of Patent: Aug. 25, 2026

(54) MULTIBAND SCANNING AND FIBER BUNDLE TO ENABLE REDUCED LIGHT SOURCE INTENSITY AND IMPROVED IMAGING QUALITY

(71) Applicant: ILLUMINA, INC., San Diego, CA (US)

(72) Inventors: Geraint Evans, Cambridge (GB); Stephen Lennon, Cambridge (GB); Danilo Condello, Madrid (ES); Stanley Hong, Palo Alto, CA (US); Dakota Watson, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 18/851,998

(22) PCT Filed: Jun. 27, 2023

(86) PCT No.: PCT/US2023/026352

§ 371 (c)(1),
(2) Date: Sep. 27, 2024

(87) PCT Pub. No.: WO2024/006284

PCT Pub. Date: Apr. 1, 2024

(65) Prior Publication Data

US 2025/0220320 A1 Jul. 3, 2025

Related U.S. Application Data

(60) Provisional application No. 63/357,943, filed on Jul. 1, 2022.

(51) Int. Cl.

| | |
|---|---|
| ***H04N 25/701*** | (2023.01) |
| ***G01N 21/64*** | (2006.01) |

(Continued)

(52) U.S. Cl.

CPC ..... *H04N 25/7013* (2023.01); *G01N 21/6428* (2013.01); *G02B 21/0052* (2013.01);

(Continued)

(58) Field of Classification Search

CPC .... H04N 25/7013; H04N 23/55; H04N 23/74; H04N 25/711; G01N 21/6428;

(Continued)

(56) References Cited

U.S. PATENT DOCUMENTS

| | | | |
|---|---|---|---|
| 5,729,640 | A | 3/1998 | Castonguay |
| 7,315,357 | B2 | 1/2008 | Ortyn et al. |

(Continued)

FOREIGN PATENT DOCUMENTS

| | | |
|---|---|---|
| AU | 2020370160 | 5/2022 |

OTHER PUBLICATIONS

Rejection Decision issued Jun. 2, 2025 in Taiwan Application 112124279.

(Continued)

*Primary Examiner* — Michael E Teitelbaum

(74) *Attorney, Agent, or Firm* — Sheppard, Mullin, Richter & Hampton LLP

(57) ABSTRACT

Some implementations of the disclosure describe an imaging system comprising: a camera including multiple image sensors that are spaced apart, each of the image sensors to capture an image of a respective sample location of multiple sample locations of a sample; and a fiber bundle comprising multiple fiber cores, each of the fiber cores to emit a light beam that is projected on a respective one of the sample locations.

22 Claims, 13 Drawing Sheets

(51) Int. Cl.

| | |
|---|---|
| ***G02B 21/00*** | (2006.01) |
| ***G06T 3/4053*** | (2024.01) |
| ***H04N 23/55*** | (2023.01) |
| ***H04N 23/74*** | (2023.01) |
| ***H04N 25/711*** | (2023.01) |

(52) U.S. Cl.

CPC ........... *G06T 3/4053* (2013.01); *H04N 23/55* (2023.01); *H04N 23/74* (2023.01); *H04N 25/711* (2023.01); *G01N 2021/6439* (2013.01)

(58) Field of Classification Search

CPC ... G01N 2021/6439; G01N 2021/6421; G01N 2021/6484; G01N 21/6452; G02B 21/0052; G02B 6/06; G02B 21/082; G02B 21/16; G02B 21/367; G02B 27/1093; G02B 21/002; G02B 21/06; G06T 3/4053

See application file for complete search history.

(56) References Cited

U.S. PATENT DOCUMENTS 8,248,466 B2 * 8/2012 Hall .................. H04N 1/19589 348/77
9,207,398 B2 12/2015 Gibson et al.
11,243,387 B2 2/2022 Zou et al.
2010/0111768 A1 5/2010 Banerjee et al.
2013/0148113 A1 6/2013 Oku et al.
2014/0247379 A1 * 9/2014 Najmabadi ........ G01N 21/6458 348/295
2017/0243373 A1 8/2017 Bevensee et al.
2017/0299852 A1 10/2017 Boamfa et al.
2017/0336618 A1 11/2017 Hulsken
2018/0114687 A1 * 4/2018 Chuang ................... H01J 61/16
2021/0080707 A1 3/2021 Zou et al.
2021/0364772 A1 * 11/2021 Skinner ................ G02B 27/425
2022/0163779 A1 5/2022 Zou et al.
2022/0171332 A1 6/2022 Cuche et al.
2022/0197002 A1 * 6/2022 Cang .................. G01N 21/6402

OTHER PUBLICATIONS

International Search Report and Written Opinion dated Oct. 2, 2023 for International Application No. PCT/US2023/026352.

Office Action dated Mar. 14, 2024 for Taiwan Application No. 112124279.

He, Da et al: “Research into multispectral TDI-CCD imaging and fusion technology”, Proceedings of SPIE; [Proceedings of SPIE ISSN 0277-786X vol. 10524] SPIE, US, vol. 10025, Nov. 4, 2016 (Nov. 4, 2016), pp. 100251L-100251L, XP060080881, ISSN: 0277-786X, DOI: 10.1117/12.2247732 ISBN: 9781510615335.

Extended European Search Report dated May 22, 2026 for European Application No. 23832246.5.

* cited by examiner 30
39
31
View A
32
33
36
34
35
38
34
37
View B1
View B2
View A
View B1
View B2
41
42
43
44
45
46

1422
1420
1418
$P_x$
$P_y$ 1412
1410
$P_x$
$P_y$
1414
1418

1402
1400
1404
1408

MULTIBAND SCANNING AND FIBER BUNDLE TO ENABLE REDUCED LIGHT SOURCE INTENSITY AND IMPROVED IMAGING QUALITY

CROSS-REFERENCE TO RELATED APPLICATION

The present application is a national stage application of and claims priority to PCT Application No. PCT/US2023/026352, filed Jun. 27, 2023 and titled "MULTIBAND SCANNING AND FIBER BUNDLE TO ENABLE REDUCED LIGHT SOURCE INTENSITY AND IMPROVED IMAGING QUALITY," which claims priority to U.S. Provisional Application No. 63/357,943, filed Jul. 1, 2022 and titled "MULTIBAND SCANNING AND FIBER BUNDLE TO ENABLE REDUCED LIGHT SOURCE INTENSITY AND IMPROVED IMAGING QUALITY." The entire contents of all of the above applications are incorporated herein by reference in their entirety.

BACKGROUND

Line scanning can refer to using a line of pixels to image a sample line by line to build a continuous image, as opposed to a camera or sensor with a two-dimensional array of pixels that capture a still image of an entire object. One particular type of line scanning is time delay integration (TDI) line scanning, which can be particularly useful in imaging applications such as sequencing. TDI imaging systems permit the imaging of moving samples, without introducing motion blurring. In TDI imaging systems, photo-electrons created on the imaging sensor can be moved along a pixel column, in synchrony with the sample motion, to remove motion blur.

TDI imaging of some samples can require a threshold signal-to-noise ratio (SNR). For example, imaging of fluorescently labeled DNA clusters requires a sufficient SNR that relates to the number of fluorescent photons released from a cluster of interest and background photons, as well as other factors, and is a function of illumination dose. Fluorescence from a cluster can be linearly dependent on the power of the radiation used to excite the dye modules. The illumination dose can be calculated as a product of the intensity of excitation light ($W/cm^2$) and the exposure time (s). As such, the shorter the exposure time for an illumination dose, the higher the excitation intensity that may be needed to provide an illumination dose that meets a threshold SNR.

FIG. 1 depicts an example design of a TDI sensor used in some imaging systems. In this example, the circle indicates the FOV of the sample supported by the imaging system, the center dark gray line represents the illumination profile used to illuminate the sample, and the light gray rectangle represents the image of the TDI sensor that images the sample. The TDI sensor of FIG. 1 has a high aspect ratio, narrow along the direction of travel, but wide along the static axis. Due to the sensor being "short" along the direction of travel, and the rapid scan speed (e.g., >10 mm/s) required for some applications, the exposure time for an imaged sample can be very brief. As a result, the required intensity of excitation light can be very high to reach a sufficient illumination dose for imaging applications such as imaging of fluorescently labeled DNA clusters. In this example, the term "high" may be relative to the power density of area scan and step and shoot imagers that use conventional cameras to image a static, wide field-of-view (FOV) (e.g., ~1×1 mm). In addition, the term "high" can refer to an intensity of excitation light that is close to the saturation intensity of dyes used during fluorescent imaging. The term "high" can also refer to an intensity of excitation light that leads to an appreciable population of the electronic triplet state.

The high-power density used in TDI imaging systems may cause photodamage (i.e., photon induced damage) of imaged biological samples if it is above a threshold value. For example, in sequencing applications, photodamage may occur to DNA, fully functional nucleotides (ffNs), fluorescent dyes, or proteins if the excitation radiation is above a threshold value. Photodamage processes like photobleaching may be understood to be dose dependent—that is at some higher power density doses, then corresponding photodamage may occur if above a threshold value. However, damage can also be related to peak power density (e.g., $W/cm^2$), rather than dose. For example, for an equivalent dose above a threshold value, a larger degree of photodamage can be seen for a sample that has a shorter exposure time and higher laser power density than for a longer exposure time and lower peak power density. This may be related to non-linear effects, as fluorescence can cause occupancy of the electronic triplet state of the dye that limits or mediates photodamage, and higher power densities can excite this or other states to even higher energy states.

SUMMARY

Some implementations described herein are directed to multi-band TDI imaging system including multiple spaced apart image sensors that are stacked along a scanning direction of the TDI imaging system. In some implementations, the imaging system is configured to match the shape of projected light beams to the multi-band sensor design. To this end, the imaging system may include a light source assembly having a fiber bundle including multiple fiber cores that emit multiple light beams.

In one embodiment, an imaging system comprises: a camera including multiple image sensors that are spaced apart, each of the image sensors to capture an image of a respective sample location of multiple sample locations of a sample; and a fiber bundle comprising multiple fiber cores, each of the fiber cores to emit a light beam that is projected on a respective one of the sample locations.

In some implementations, the imaging system further comprises one or more beam shaping optics positioned in an optical path between an output of the fiber bundle and the sample, the one or more beam shaping optics to shape the light beams into shapes that correspond to shapes of the sample locations and shapes of the image sensors.

In some implementations, each of the image sensors is rectangular; and the one or more beam shaping optics comprise a collimator to shape the light beams into illumination lines.

In some implementations, the collimator comprises: a first acylindrical lens to shape the light beams in a first axis, the first acylindrical lens having a first focal length; and a second acylindrical lens to shape the light beams in a second axis orthogonal to the first axis, the second acylindrical lens having a second focal length different from the first focal length.

In some implementations, each of the fiber cores is square.

In some implementations, the camera is a TDI camera.

In some implementations, the one or more beam shaping optics further comprise an objective to focus the light beams, the objective positioned in an optical path between the collimator and the sample.

In some implementations, the imaging system is a structured illumination imaging system; and the imaging system further comprises a light structuring optical assembly to structure each of the light beams such that each of the light beams projected on the sample locations comprises a plurality of fringes.

In some implementations, the light structuring optical assembly comprises: a diffraction grating; and a grating projection lens positioned in an optical path between the diffraction grating and the sample.

In some implementations, the sample is asymmetrically patterned, and the diffraction grating comprises multiple parts.

In some implementations, the imaging system further comprises: a processor to reconstruct, based on the images captured by the image sensors, an image having a higher resolution than each of the images captured by the sensors.

In some implementations, the images captured by the image sensors comprise multiple phase images.

In some implementations, the number of the fiber cores is the same as the number of the image sensors.

In some implementations, the multiple fiber cores comprise: a first plurality of fiber cores to emit light beams having a first wavelength; and a second plurality of fiber cores to emit light beams having a second wavelength.

In some implementations, the fiber optical bundle comprises: a first branch including the first plurality of fiber cores, the first branch to couple to a first light source that emits light in the first wavelength; and a second branch including the second plurality of fiber cores, the second branch to couple to a second light source that emits light in the second wavelength.

In one embodiment, an imaging system comprises: a TDI camera including multiple image sensors that are spaced apart along a scanning direction of the imaging system, each of the image sensors to capture an image of a respective sample location of multiple sample locations of a sample; a light source assembly to emit multiple light beams; and one or more beam shaping optics to shape the multiple light beams into multiple lines having shapes that correspond to shapes of the sample locations and shapes of the image sensors, each of the lines projected on a respective one of the sample locations.

In some implementations, the light source assembly includes a fiber bundle comprising multiple fiber cores, each of the fiber cores to emit a respective one of the light beams.

In some implementations, each of the fiber cores is square; and the one or more beam shaping optics comprise a collimator to shape the multiple light beams into the multiple lines.

In some implementations, the collimator comprises: a first acylindrical lens to shape the light beams in a first axis, the first acylindrical lens having a first focal length; and a second acylindrical lens to shape the light beams in a second axis orthogonal to the first axis, the second acylindrical lens having a second focal length different from the first focal length.

In one embodiment, an imaging system comprises: a camera including multiple TDI image sensors that are spaced apart, each of the image sensors to capture an image of a respective sample location of multiple sample locations of a sample; and the sample, wherein the sample comprises a plurality of nucleic acids to be analyzed, and the multiple TDI image sensors enable a lower power density for imaging than would be required with a single sensor.

In some implementations, the imaging system further comprises an asymmetrically patterned flowcell including the sample.

In some implementations, the imaging system further comprises a processor to form a composite image of the images captured by the multiple TDI image sensors. In some implementations, prior to forming the composite image, the processor is to align the images.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

BRIEF DESCRIPTION OF THE DRAWINGS

The present disclosure, in accordance with one or more various implementations, is described in detail with reference to the following figures. The figures are provided for purposes of illustration only and merely depict typical or example implementations.

Figure 1:
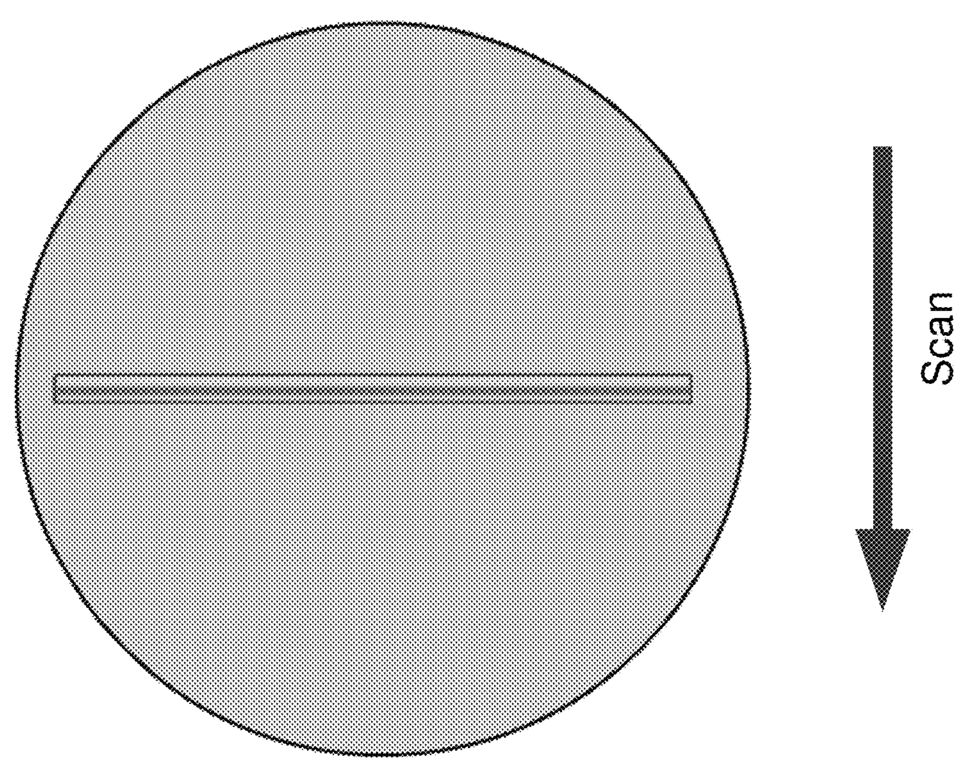
FIG. 1 depicts an example design of a TDI sensor used in some imaging systems.

The figures are not exhaustive and do not limit the present disclosure to the precise form disclosed.

DETAILED DESCRIPTION

As used herein to refer to diffracted light emitted by a diffraction grating, the term "order" or "order number" is intended to mean the number of integer wavelengths that represents the path length difference of light from adjacent slits of the diffraction grating for constructive interference. The term "zeroth order" or "zeroth order maximum" is intended to refer to the central bright fringe emitted by a diffraction grating in which there is no diffraction. The term "first-order" is intended to refer to the two bright fringes emitted on either side of the zeroth order fringe, where the path length difference is ±1 wavelengths.

As used herein to refer to a sample, the term "spot" or "feature" is intended to mean a point or area in a pattern that can be distinguished from other points or areas according to relative location. An individual feature can include one or more molecules of a particular type. For example, a feature can include a single target nucleic acid molecule having a particular sequence or a feature can include several nucleic acid molecules having the same sequence (and/or complementary sequence, thereof).

As used herein, the term "tile" generally refers to one or more images of the same region of a sample, where each of the one or more images may represent a respective color wavelength range. A tile may form an imaging data subset of an imaging data set of one imaging cycle.

As used herein, the term "xy coordinates" is intended to mean information that specifies location, size, shape, and/or orientation in an xy plane. The information can be, for example, numerical coordinates in a Cartesian system. The coordinates can be provided relative to one or both of the x and y axes or can be provided relative to another location in the xy plane. For example, coordinates of a feature of an object can specify the location of the feature relative to location of a fiducial or other feature of the object.

As used herein, the term "xy plane" is intended to mean a 2 dimensional area defined by straight line axes x and y. When used in reference to a detector and an object observed by the detector, the area can be further specified as being orthogonal to the direction of observation between the detector and object being detected. When used herein to refer to a line scanner, the term "y direction" refers to the direction of scanning.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical imaging system may be specified along the z axis.

As used herein, the term "scanning" is intended to mean detecting a 2-dimensional cross-section in an xy plane of an object, the cross-section being rectangular or oblong. For example, in the case of fluorescence imaging an area of an object having rectangular or oblong shape can be specifically excited (at the exclusion of other areas) and/or emission from the area can be specifically acquired (at the exclusion of other areas) at a given time point in the scan.

Figure 2:
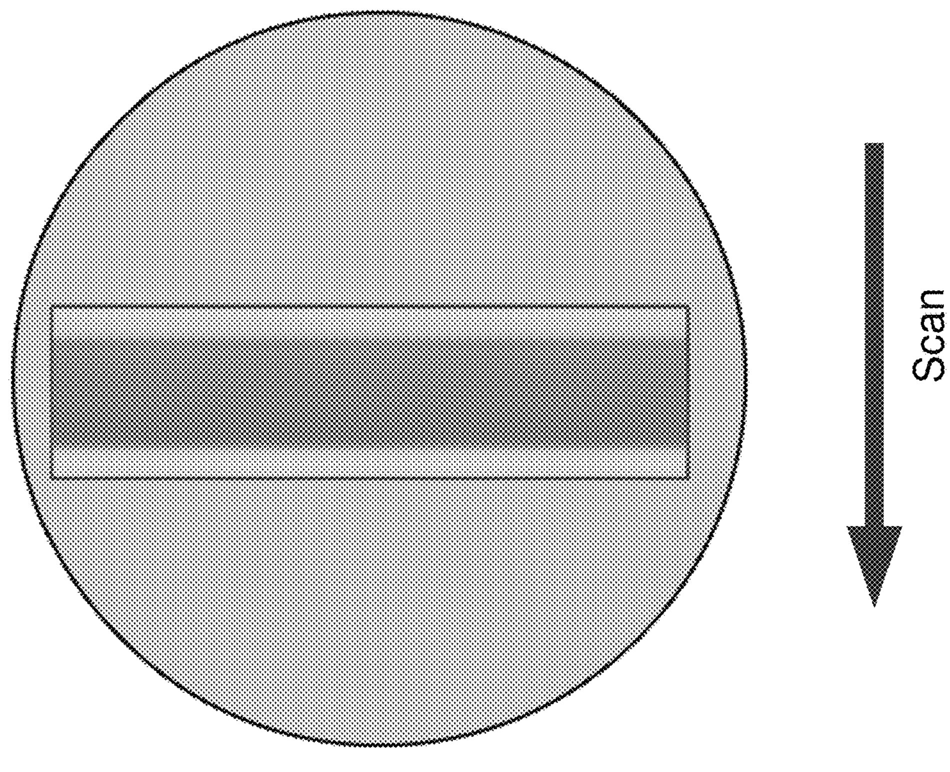
FIG. 2 illustrates one example of a TDI sensor taller than the TDI sensor of FIG. 1.

As discussed above, TDI sensors may require a greater intensity of excitation light because of the relatively short exposure time due to the sensor being short along the direction of travel as illustrated in FIG. 1. The shortened exposure times may be a result of increasing scan speed or throughput speeds. To meet the increasing scanning speeds and the corresponding decrease in exposure time, the power density may be increased to sufficiently excite the fluorophores associated with a sample of interest. However, if the power density is increased above a threshold value, such as above a photosaturation threshold of a fluorescent dye associated with a sample of interest or a photodamage of the biological sample threshold, then photodamage or photosaturation may occur. To avoid this, a "taller" TDI sensor having more combined TDI stages/scan lines can allow integration over a longer period of time and reduce the amount of illumination intensity to which a portion of the sample or the fluorescent dye is exposed. For example, FIG. 2 illustrates one example of a TDI sensor that is taller than the TDI sensor of FIG. 1. However, taller TDI sensors can increase the hardware specifications for the imaging device, including the sample scanner, the vibration control, the optics, and/or the alignment. For example, when an image of clusters is scanned across a TDI sensor, the image may need to move such that the image remains substantially aligned with a single-column of pixels. That is, the lateral variation of the imaged cluster may need to be controlled such that the emission light from the cluster moves less than one pixel in either direction (i.e., <±1 pixel) over the entire scan direction length of the TDI sensor. Any further lateral movement of the sample/image could cause blurring by the emission light shifting to adjacent columns of pixels of the TDI sensor. This blurring can be minimized by using high accuracy, complex scanning stages that are very straight and have very little wobble as they move in the scan direction. In addition, auxiliary X-stages may need to hold their position very well, and the total system may need to have very little vibration or "pull" on the moving sample. Similarly, at the edges of the optical field, optical distortions can cause the motion of a sample spot to "curve" in the image plane, again causing the emission light from the cluster at a sample spot to blur across multiple pixels. The longer the scan distance (e.g., the taller the TDI scanner), the more difficult or costly the above optical, motion, and/or stability specifications can become, such as if external vibrations are not sufficiently controlled (for example, equipment adjacent or near an instrument or movement of lab personnel in proximity to the instrument). As such, although tall band TDI imaging may mitigate the high peak power requirement of standard TDI imaging, such sensors may have very narrow specification requirements that may be difficult to meet, particularly in use cases where vibrations external to the instrument may be less controlled.

Figure 3:
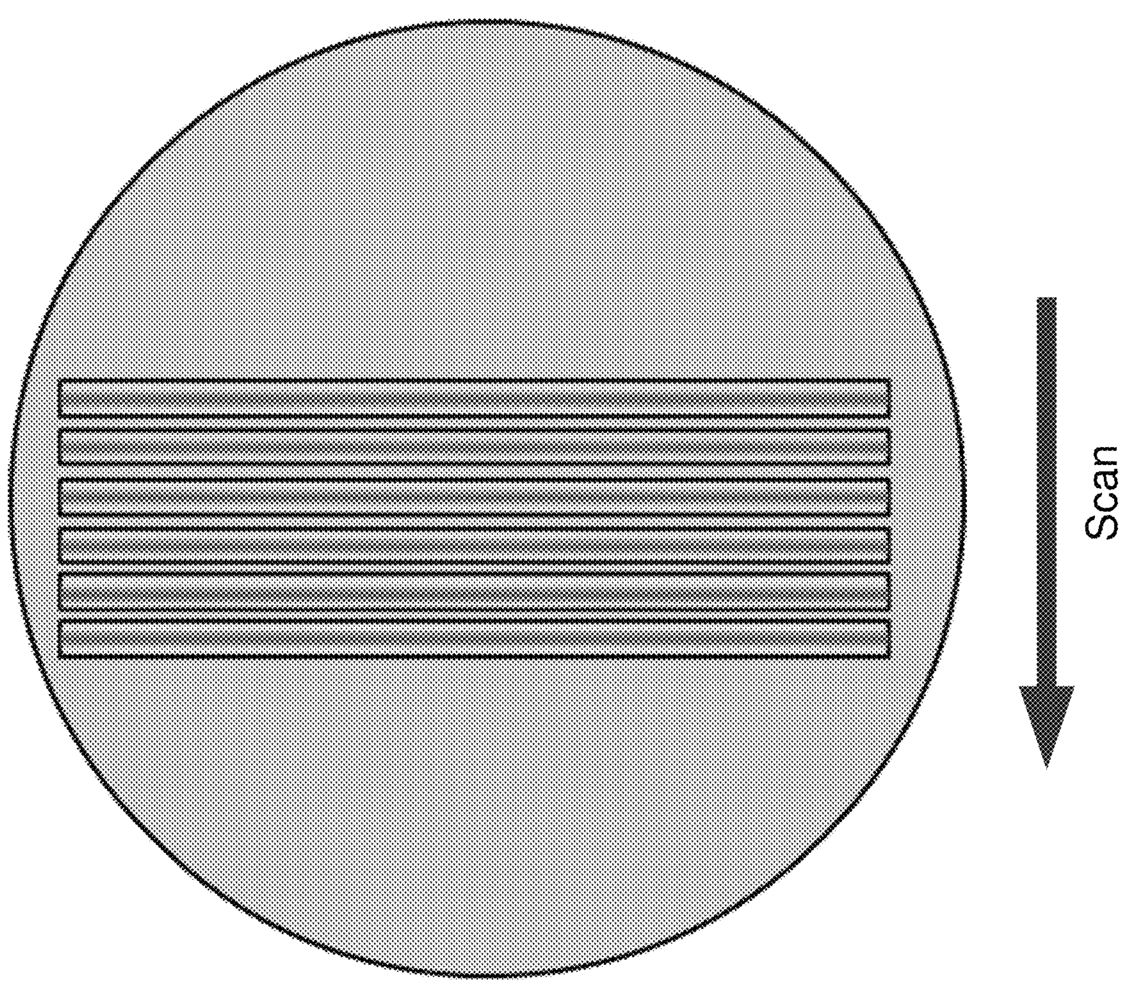
FIG. 3 illustrates one example of a multi-band TDI sensor, including multiple spaced apart sensors spaced along a direction of scanning, in accordance with some implementations of the disclosure.

To mitigate at least some of the aforementioned deficiencies of standard and tall band TDI imaging systems, implementations described herein are directed to "multi-band" TDI imaging sensors including multiple spaced apart image sensors that are stacked along a scanning direction of the TDI imaging system. FIG. 3 illustrates one example of a multi-band TDI sensor, including multiple spaced apart sensors, in accordance with some implementations of the disclosure. During operation, each of the sensors of the multi-band camera is configured to produce its own image of the sample. A composite image can be formed from a combination of the images from each of the individual sensors.

By virtue of a multi-band design that uses multiple sensors that are spaced apart along a scanning direction of the imaging system to collect multiple sample images that form a composite image (e.g., a composite sequencing image), the collection of an image can be extended across a larger number of pixels in the scan direction without using a single tall TDI sensor. Such an arrangement may enable a longer total exposure time when considering the total exposure time for the combination of the multiple TDI sensors. In addition, the arrangement may also reduce the peak power and, consequently, the photodamage above a threshold value by distributing the exposure over a larger area as contrasted with the short sensor design of FIG. 1. As such, the total dose provided to a sample may be able to meet the total intensity to increase scan speeds or throughput while also using a lower power density due to the distribution over a number of TDI sensors. Additionally, by virtue of the multi-band design of FIG. 3, narrower increased imaging system specification requirements associated with the taller TDI scanner of FIG. 2 can be avoided.

Furthermore, if some lateral drift does occur, the shortness of each sensor in the direction of travel may limit the likelihood of blurring along the direction of travel of that sensor due to the limited length of the sensor in the scan direction. If the lateral drift over each sensor is limited such that the emitted light detected does not drift across multiple pixels, then the composite images can be aligned even if there is larger lateral drift between stages or over the entire multi-band TDI sensor assembly. For example, if emitted light is received by the first sensor at a first lateral location and is subsequently received by the second sensor at a second sensor at a second lateral location that is laterally offset by, for example, one pixel or more relative to the first lateral location, then the system can correct for the drift offset between the first sensor and second sensor so the first location and second location are substantially co-located when the composite image is reconstructed. Thus, even if more sensors are used, such as six sensors, ten sensors, etc., any potential lateral drift may still be corrected during composite image reconstruction without requiring the emitted light to project on along the same pixel location of each of the sensors along the scan direction.

Further implementations disclosed herein are directed to an imaging system configured to match the shape of projected light beams to the multi-band camera design described above. In accordance with such implementations, the imaging system can include a light source assembly having a fiber bundle including multiple fiber cores that emit multiple light beams. Each of the light beams is projected on a location of the sample corresponding to the imaged field of view (FOV) of a respective one of the multiple spaced apart image sensors. For example, multiple illumination lines generated using the fiber bundle can be projected onto a sample to match the shape of the TDI bands.

By virtue of shaping the illumination to match the imaged FOV of the multi-band camera, photobleaching and photodamage (e.g., DNA damage) from unnecessary exposure the substrate and/or samples or fluorophores outside of the FOV that are not being imaged by the sensors can be minimized while the laser power density in the region of interest can be maximized. Moreover, power utilization of a laser light source can be optimized to a minimum sufficient to illuminate the area of interest. This can be particularly advantageous in biological imaging applications such as sequencing by synthesis (SBS), where imaging and sequencing quality can be improved, such as by exposing the sample, substrate, and/or fluorophores to only the amount of light needed for each scan cycle. These and other advantages that can be realized by the implementations described herein are further described below.

Before describing various implementations of the imaging systems and methods disclosed herein in detail, it is useful to describe an example environment with which the technology disclosed herein can be implemented. One such example environment is that of an illumination imaging system 400, illustrated in FIG. 4, that illuminates a sample with excitation light. In some implementations, such as that shown in FIG. 4, the illumination imaging system 400 may be a structured illumination imaging system with spatially structured light. For example, system 400 may be a structured illumination fluorescence microscopy system that utilizes spatially structured excitation light to image a biological sample. Although a structured illumination imaging system is described in this example, it should be appreciated that the multi-band imaging techniques described herein can be implemented in other imaging systems, such as a TDI imaging system without structured illumination.

Figure 4:
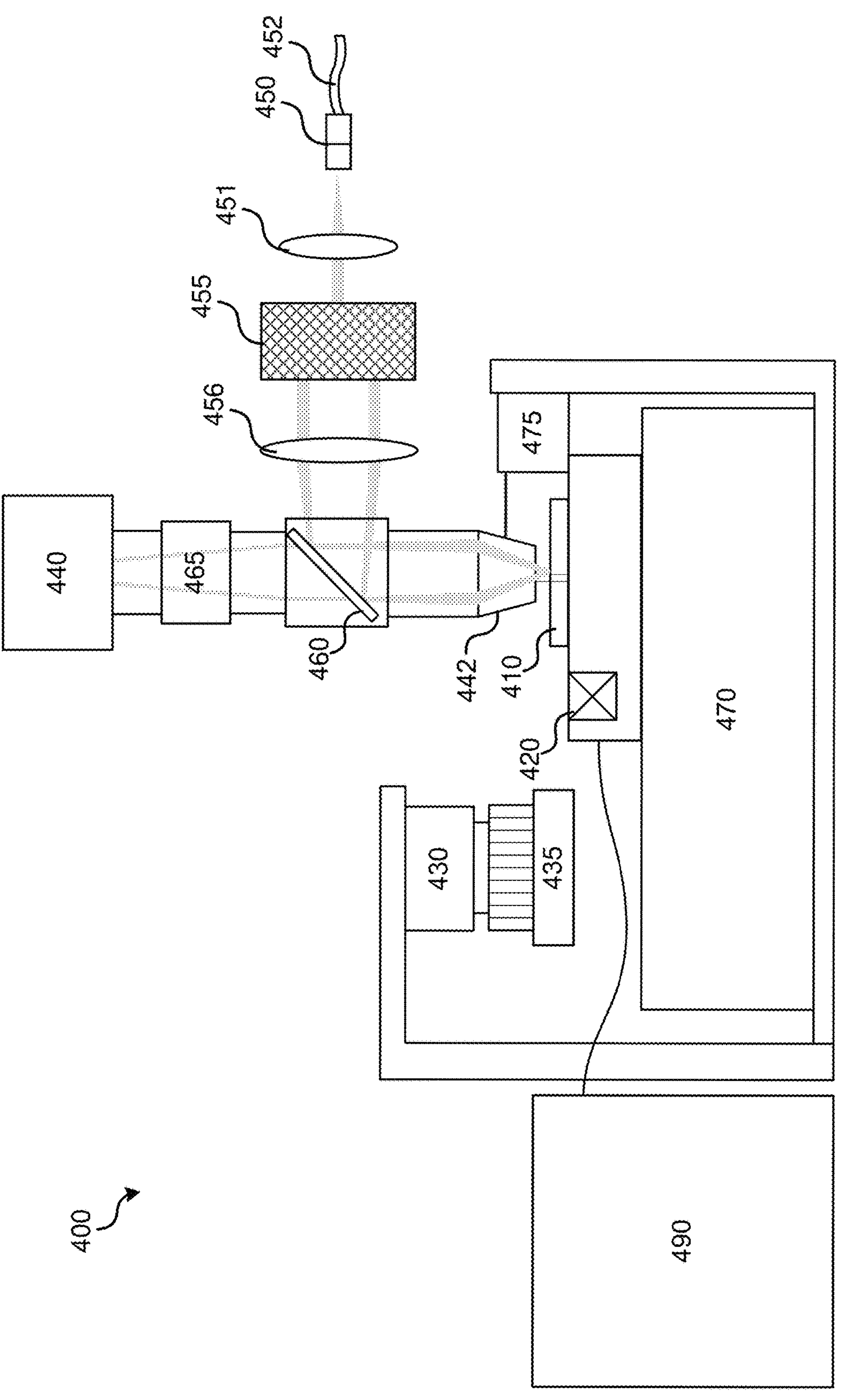
FIG. 4 depicts an imaging system in accordance with some implementations of the disclosure.

In the example of FIG. 4, a light emitter assembly 450 is configured to output a light beam that is shaped by beam-shaping optics 451 (e.g., collimator). The shaped light is structured (patterned) by light structuring optical assembly 455 and directed by dichroic mirror 460 through objective lens 442 onto a sample of a sample container 410, which is positioned on a stage 470. In the case of a fluorescent sample, the sample fluoresces in response to the structured excitation light, and the resultant light is collected by objective lens 442 and directed to an image sensor of camera system 440 to detect fluorescence. In some implementations, tube lens 456 and objective lens 442 can together form an imaging system that projects fringes of diffraction grating 455 onto a sample of sample container 410. In systems that do not implement structured illumination, the optical assembly 455 may be omitted.

In imaging system 400, light emitter assembly 450 can be a coherent light emitter such as an emitter of light output by one or more lasers or laser diodes. In alternative implementations, it can be an incoherent light emitter (e.g., emitting light beams output by one or more excitation diodes). In the example of system 400, light emitter assembly 450 includes an optical fiber bundle 452 including multiple fiber cores for guiding multiple respective optical beams to be output. The bundle can contain a stack of multimode fiber cores separated by cladding regions. As further discussed below the number of optical fiber cores can be matched to a number of sensors of camera system 440. The optical fiber bundle 452 can be utilized by coupling a laser light source on one end and imaging the other end onto the sample to provide shaped laser illumination. In implementations where imaging system 400 is a single wavelength range imaging system, the light source can emit light in a single wavelength range.

In implementations utilizing structured illumination in a multi-channel imaging system (e.g., a multi-channel fluorescence microscope utilizing multiple wavelength ranges of light), optical fiber bundle 452 can optically couple to a plurality of different light sources (not shown), each light source emitting light of a different wavelength range. For example, light corresponding to different wavelength ranges in the visible color spectrum such as blue, green, red, and/or other colors may be emitted. Although imaging system 400 is illustrated as having a single light emitter assembly 450, in some implementations multiple light emitter assemblies 450 as described above can be included. For example, multiple light emitter assemblies 450 could be utilized in imaging systems having multiple multi-band TDI cameras. In such implementations, each light emitter assembly 450 could be matched to a respective multi-band TDI camera.

In alternative implementations, light emitter assembly 450 may use means other than an optical fiber bundle 452 to generate multiple light beams imaged on the sample plane. For example, a single optical fiber core may output a light beam that is shaped into multiple lines using a combination of various beam-shaping optics such as Powell lenses and the like. Alternatively, some other means of generating multi beams and/or beam-shaping optics may be used. In alternative implementations, light emitter assembly 450 may output a single light beam that is projected in an area of the sample imaged by a multi-band camera as described herein.

In implementations that utilize structured illumination, light structuring optical assembly 455 can include one or more optical diffraction gratings to generate a sinusoidal pattern of diffracted light (e.g., fringes) that is projected onto samples of a sample container 410. The diffraction gratings may be one-dimensional or two-dimensional transmissive, reflective, or phase gratings. In imaging system 400, the diffraction gratings do not necessarily involve a rotation stage. In some implementations, the diffraction gratings can be fixed (e.g., not rotated or moved linearly) during operation of the imaging system. For example, in a particular implementation the diffraction gratings can include two fixed one-dimensional transmissive diffraction gratings oriented substantially or exactly/perfectly perpendicular to each other (e.g., a horizontal diffraction grating and vertical diffraction grating), or multiple gratings with a fixed phase relation to each other.

During each imaging cycle, imaging system 400 can utilize light structuring optical assembly 455 to acquire a plurality of images at various phases, displaced laterally along the sample plane (e.g., along x-y plane), with this procedure repeated one or more times by rotating the pattern orientation about the optical axis (i.e., with respect to the x-y plane of the sample) or by shifting the pattern using other phase shifting components. The captured images can then be spatially reconstructed to generate a higher resolution image (e.g., an image having about twice the lateral spatial resolution of individual images). In implementations that do not utilize structured illumination, the light structuring assembly 455 may be omitted.

In some implementations, imaging system 400 may include a projection lens 456 that may articular or include a lens element to articulate along a longitudinal axis of the projection lens 456 to adjust the structured beam shape and path. For example, a component of the projection lens 456 may be articulated to account for a range of sample thicknesses (e.g., different cover glass thickness) of the sample in container 410. In other implementations, the projection lens 456 may be fixed and/or omitted and a moveable lens element may be positioned within a tube lens assembly in the emission optical path to account for focusing on an upper interior surface or lower interior surface of the sample container 410 and/or spherical aberration introduced by movement of the objective lens 442.

Imaging system 400 can include a fluid delivery module or device 490 that may direct the flow of reagents (e.g., fluorescently labeled nucleotides, buffers, enzymes, cleavage reagents, etc.) to (and through) sample container 410 and waste valve 420.

Sample container 410 can include one or more substrates upon which the samples are provided. For example, in the case of a system to analyze a large number of different nucleic acid sequences, sample container 410 can include one or more substrates on which nucleic acids to be sequenced are bound, attached or associated. The substrate can include any substrate to which nucleic acids can be attached, such as for example glass surfaces, plastic surfaces, latex, dextran, polystyrene surfaces, polypropylene surfaces, polyacrylamide gels, gold surfaces, and silicon wafers. In some applications, the substrate is within a channel or includes a channel formed within the substrate or other area at a plurality of locations formed in a matrix or array across the sample container 410. Imaging system 400 also may include a temperature station actuator 430 and heater/cooler 435 that can optionally regulate the temperature of conditions of the fluids within the sample container 410. In some implementations, the heater/cooler 432 may be fixed to a sample stage 470 upon which the flow cell 410 is placed and/or may be integrated therein to sample stage 470.

In particular implementations, the sample container 410 may be implemented as a patterned flow cell including a translucent cover plate and a substrate that are configured to contain or allow a liquid to flow therebetween, and a biological sample may be located at an inside surface of the translucent cover plate and/or an inside surface of the substrate. The flow cell may include a large number (e.g., thousands, millions, billions, or more) of wells or regions that are patterned into a defined array (e.g., a hexagonal array, rectangular array, etc.) into the substrate. Each region may form a cluster (e.g., a monoclonal cluster, a substantially monoclonal cluster, or a polyclonal cluster) or more one than cluster of a biological sample such as DNA, RNA, or another genomic material which may be sequenced, for example, using sequencing by synthesis. A substantially monoclonal cluster may be one where a particular sample forms a distinguishable portion of the cluster even if the cluster itself is polyclonal as a result of one or more other samples being present within the cluster. The flow cell may be divided into a number of physically separated lanes (e.g., eight lanes), with each lane including an array of clusters, such as a hexagonal array of clusters or a rectilinear array of clusters. During each cycle of sequencing, each surface (e.g., upper and lower) of each lane may be imaged in separate swaths (e.g., three), and any number of images or tiles may be collected for each swath.

Images can be obtained in one wavelength range or multiple wavelength ranges (e.g., two or four). In a particular implementation, images may be obtained in two different color wavelength ranges, which may be used to distinguish a particular nucleotide base type from another. More particularly, "base calling," which generally refers to a process of a determining a base call (e.g., adenine (A), cytosine (C), guanine (G), or thymine (T)) for a given spot location of an image at an imaging cycle may be implemented. During base calling, image data extracted from images may be used to determine the presence of one of four base types. For a given spot or location in each of the images, the base identity may be determined based on whether the combination of signal identities statistically corresponds to a predetermined set of intensity values or ranges that is defined as corresponding to a corresponding base call.

Sample container 410 can be mounted on a sample stage 470 to provide movement and alignment of the sample container 410 relative to the objective lens 442. The sample stage 470 can have one or more actuators to allow the sample stage 470 to move in one or more of any of three dimensions. For example, in terms of the Cartesian coordinate system, actuators can be provided to allow the stage to move in the X, Y and/or Z directions relative to the objective lens 442, tilt relative to objective lens 442, and/or otherwise move relative to objective lens 442. Movement of sample stage 470 can allow one or more sample locations on sample container 410 to be positioned in optical alignment with objective lens 442. Movement of sample stage 470 relative to objective lens 442 can be achieved by moving the sample stage 470 itself, the objective lens 442, some other component of the imaging system, or any combination of the foregoing. For instance, in some implementations, the sample stage 470 may be actuatable in the X and Y directions relative to the objective lens 442 while a focus component 475 or Z-stage may move the objective lens 442 along the Z direction relative to the sample stage 470. Further implementations may also include moving the entire imaging system over a stationary sample. Thus, in some versions, sample container 410 may be fixed during imaging while one or more components of imaging assembly 420 is/are moved to capture images at different regions of sample container 410.

In some implementations, a focus component 475 may be included to control positioning of the objective lens 442 relative to the sample container 410 in the focus direction (typically referred to as the z axis, or z direction). Focus component 475 can include one or more actuators physically coupled to the objective lens 442, the optical stage, the sample stage 470, or a combination thereof, to move the sample container 410 on the sample stage 470 relative to the objective lens 442 to provide proper focusing for the imaging operation. In some implementations, the focus component 475 may utilize a focus tracking module (not shown) that is configured to detect a displacement of the objective lens 442 relative to a portion of the sample container 410 and output data indicative of an in-focus position to the focus component 475 to move the objective lens 442 to position the corresponding portion of the sample container 410 in focus of the objective lens 442.

In some implementations, an actuator of the focus component 475 or for the sample stage 470 may be physically coupled to objective lens 442, the optical stage, the sample stage 470, or a combination thereof, such as, for example, by mechanical, magnetic, fluidic or other attachment or contact directly or indirectly to or with the stage or a component thereof. The actuator of the focus component (175) can be configured to move the objective lens 442 in the z-direction while maintaining the sample stage 470 in the same plane (e.g., maintaining a level or horizontal attitude, substantially or perfectly perpendicular to the optical axis). It can be appreciated that perfect perpendicularity, parallelism, or other orientation may not be achievable in accordance with some examples or implementations due to, e.g., manufacturing tolerances, operational limitations, etc. However, for the purposes of the technologies disclosed herein, substantially perpendicular, parallel or other orientation is understood to mean an orientation sufficient to achieve a desired resolution or other relevant effect as described and/or contemplated herein. In some implementations, the sample stage 470 includes an X direction actuator and a Y direction actuator to form an X-Y stage. The sample stage 470 may also be configured to include one or more tip or tilt actuators to tip or tilt the sample stage 470 and/or a portion thereof, such as a flow cell chuck. This can be done, for example, so that sample container 410 can be leveled dynamically to account for any slope in its surfaces.

When an excitation emission, such as excitation light, is projected onto the sample container 410, a corresponding element, such as a fluorophore, can emit a responsive emission that is detectable, such as emission light from an excited fluorophore. In other implementations, excitation radiation other than light and emission radiation other than light may be used. The light emanating from one or more fluorophores associated with a test sample at a sample location being imaged can be directed through dichroic mirror 460 to sensors of camera system 440. As noted above, in some implementations, a tube lens assembly may be positioned between the objective lens 442 and the dichroic mirror 460 or between the dichroic mirror 460 and the image sensor of the camera system 440. A moveable lens element may be translatable along a longitudinal axis of the tube lens assembly to account for focusing on an upper interior surface or lower interior surface of the sample container 410 and/or spherical aberration introduced by movement of the objective lens 442. In some implementations, a filter switching assembly 465 with one or more emission filters may be included, where the one or more emission filters can be used to pass through particular ranges of emission wavelengths and block (or reflect) other ranges of emission wavelengths. For example, the one or more emission filters may be used to direct different wavelength ranges of emitted light to different image sensors of the camera system 440 of the imaging system. In a particular implementation, the emission filters may be implemented as dichroic mirrors that direct emission light of different wavelength ranges to different image sensors of camera system 440.

Camera system 440 can include one or more image sensors to monitor and track the imaging (e.g., sequencing) of sample container 410. Camera system 440 can be implemented, for example, as a charge-coupled device (CCD) image sensor camera, but other image sensor technologies (e.g., active pixel sensor) can be used. Output data (e.g., images) from camera system 440 may be communicated to a real time analysis module (not shown) that may be implemented as a software application that, as further described below, may reconstruct the images captured during each imaging cycle to create an image having a higher spatial resolution.

As further described below, camera system 440 can be implemented as a multi-band TDI camera having multiple image sensors that are spaced apart along a scanning direction of the imaging system. For example, the camera system 400 may be a TDI CCD camera that effectuates line scanning techniques using multiple spaced apart image sensors, where each sensor produces its own image of the sample, and a composite image is formed from a combination of the images.

Although not illustrated, a controller can be provided to control the operation of structured illumination imaging system 400, including synchronizing the various optical components of system 400. The controller can be implemented to control aspects of system operation such as, for example, configuration of light structuring optical assembly 455 (e.g., selection and/or linear translation of diffraction gratings and/or a phase shifter or other optical component), movement of projection lens 456 or the lens element thereof, movement of a lens element of a tube lens, focus component 475, sample stage 470 and/or optical stage movement, and imaging operations. In various implementations, the controller can be implemented using hardware, algorithms (e.g., machine executable instructions), or a combination of the foregoing, such as one or more printed circuit board assemblies and/or a computing engine. For example, in some implementations the controller can include one or more CPUs or processors with associated memory. As another example, the controller can comprise hardware or other circuitry to control the operation, such as a computer processor and a non-transitory computer readable medium with machine-readable instructions stored thereon. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller can comprise a combination of this circuitry with one or more processors.

Figure 5:
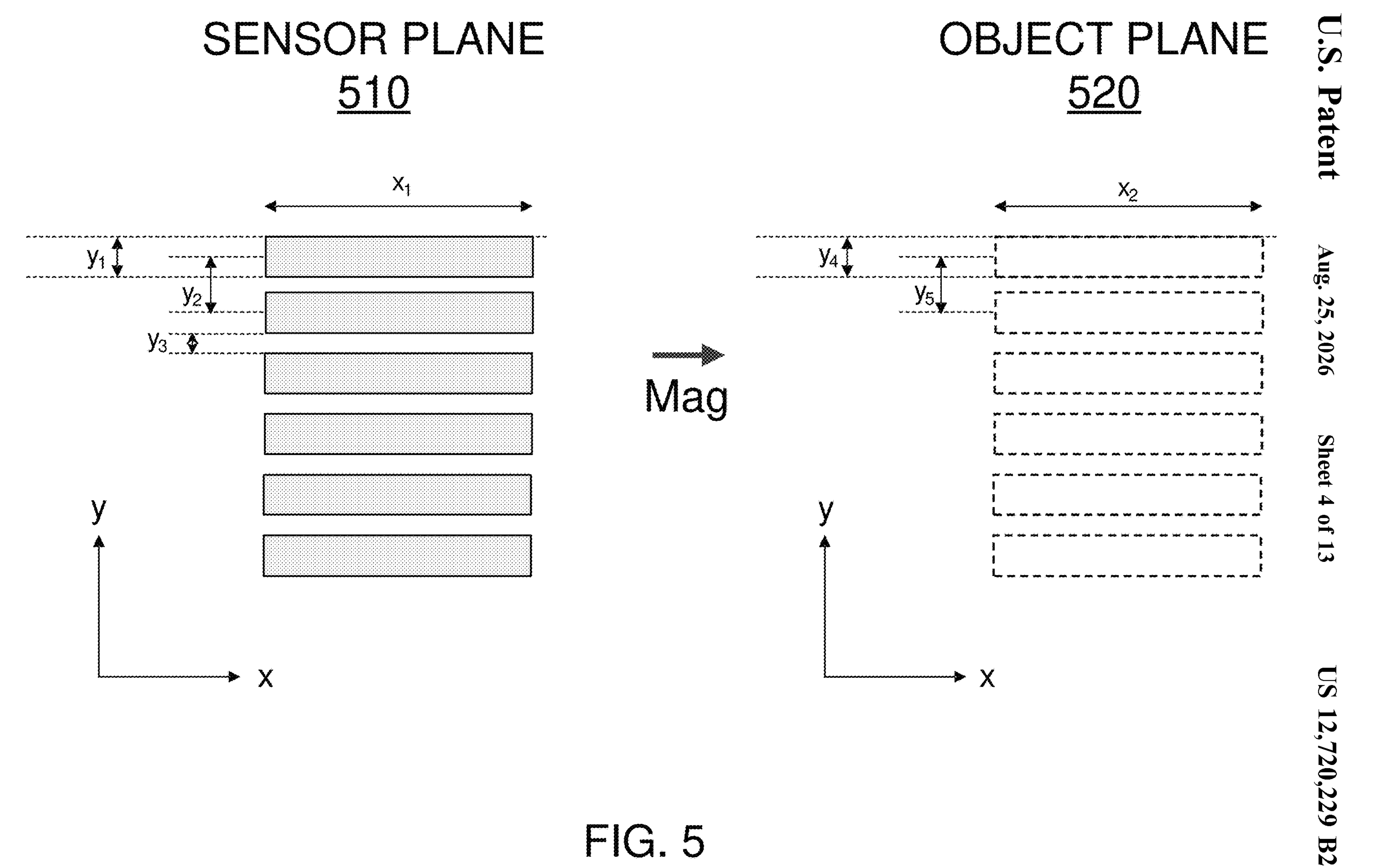
FIG. 5 depicts a sensor plane and object plane of an imaging system utilizing a multi-band camera, in accordance with some implementations of the disclosure.

FIG. 5 depicts a sensor plane 510 and object plane 520 (located at a plane of interest in the sample container 410) of an imaging system utilizing a multi-band TDI camera, in accordance with some implementations of the disclosure. As shown by sensor plane 510, the camera in this example has six sensors with a sensor height of $y_1$, a sensor width of $x_1$, a center-to-center distance of $y_2$ between sensors, and an edge-to-edge gap of $y_3$ between sensors. These parameters can be considered when matching the sensor plane 510 to object plane 520.

In order to match the illumination depicted by object plane 520 that is located at a plane of interest in the sample container 410 to conjugate sensor regions as depicted by the sensor plane 510 showing corresponding image of sensors, the following parameters can be considered for six spaced apart illumination regions in the object plane 520: illumination height of $y_4$, illumination width of $x_2$, and center-to-center distance of $y_5$ between illumination regions. Additionally, the magnification (Mag) from the sensor plane 510 to the object plane 520 can be considered. In some implementations, $y_4=Mag*y_1$, $y_5=Mag*y_2$, and $x_2=Mag*x_1$. In one particular embodiment, $y_1$ is about 1.38 mm, $y_2$ is about 1.57 mm, $y_3$ is about 0.19 mm, and $x_1$ is about 22.12 mm; $y_4$ is about 42.6 μm, $y_5$ is about 48.5 μm, and $x_2$ is about 684 μm; and Mag is about 1/32.36. In one particular embodiment, the sensor has 4096 by 256 pixels, and a pixel size of about 5.4 μm.

Figure 6:
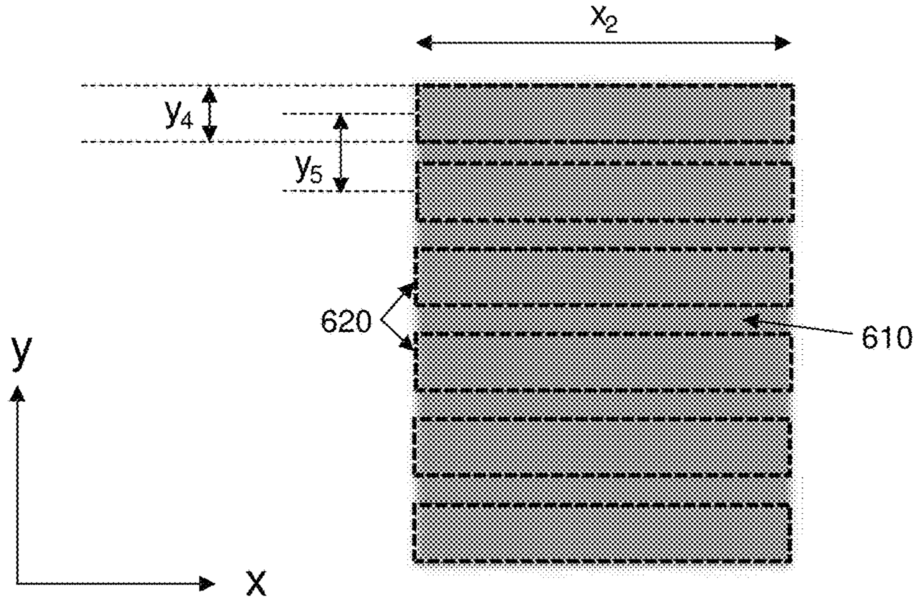
FIG. 6 depicts an example of an illuminated object plane when illumination is not matched to conjugate sensor regions.

FIG. 6 depicts an example of an illuminated object plane 520 when illumination 610 (i.e., shaded portion of FIG. 6) is not matched to conjugate sensor regions. The image 620 of the sensor regions (i.e., the regions of the sample imaged onto the sensors) is depicted by the dashed rectangular lines. The illumination 610 does not account for the gaps between the sensors, which are not imaged. Illumination 610 can be generated by imaging the core of one laser-coupled optical fiber onto the sample. As depicted using only one fibre can be inefficient because unnecessary portions of the sample corresponding to the gaps between the sensors are irradiated. This unnecessary radiation can cause photobleaching and/or DNA degradation in the sample. Additionally, the rectangular illumination 610 that irradiates the gap regions can waste power of the light source (e.g., laser).

Figure 7:
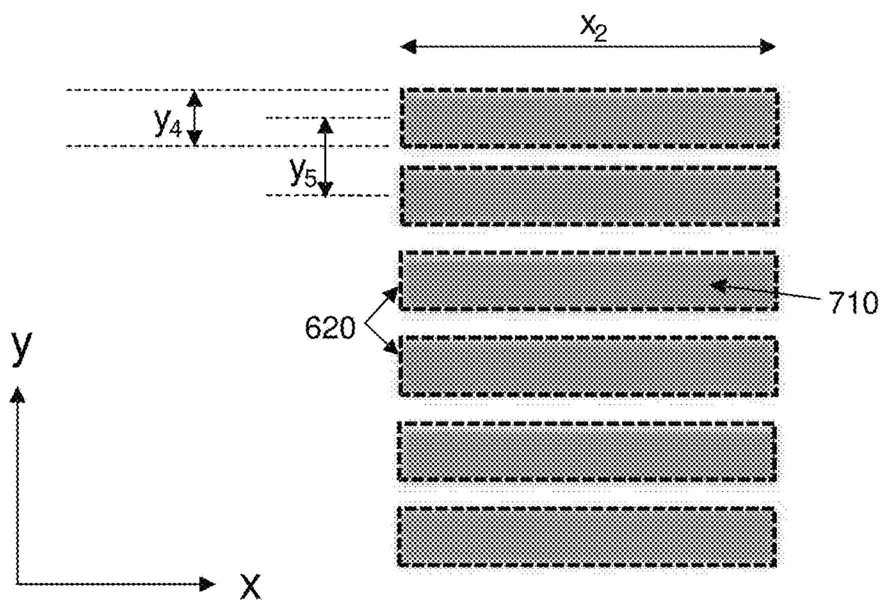
FIG. 7 depicts an illuminated object plane when illumination is matched to conjugate sensor regions, in accordance with some implementations of the disclosure.

FIG. 7 depicts an illuminated object plane 520 when illumination 710 (i.e., shaded portion of FIG. 7) is matched to conjugate sensor regions. The image 620 of the sensor regions is depicted by dashed rectangular lines. By virtue of matching the projected illumination 710 to the shape of the sensor regions, photobleaching and power waste from the light source can be reduced or eliminated. The illumination 710 can be generated using an optical fiber bundle including a stack of fiber cores separated by cladding regions. The fiber cores can be multimode fiber cores. As described herein with reference to particular implementations, the fiber cores can have a square cross section. For example, in particular implementations, each of the fiber cores is 320×320 μm or 400×400 μm. However, in other implementations the fiber cores can have rectangular or circular cross sections. The fiber bundle can be utilized by coupling laser light (e.g. laser diodes) into one end and imaging the other end onto the sample to provide shaped laser illumination 710.

Figure 8:
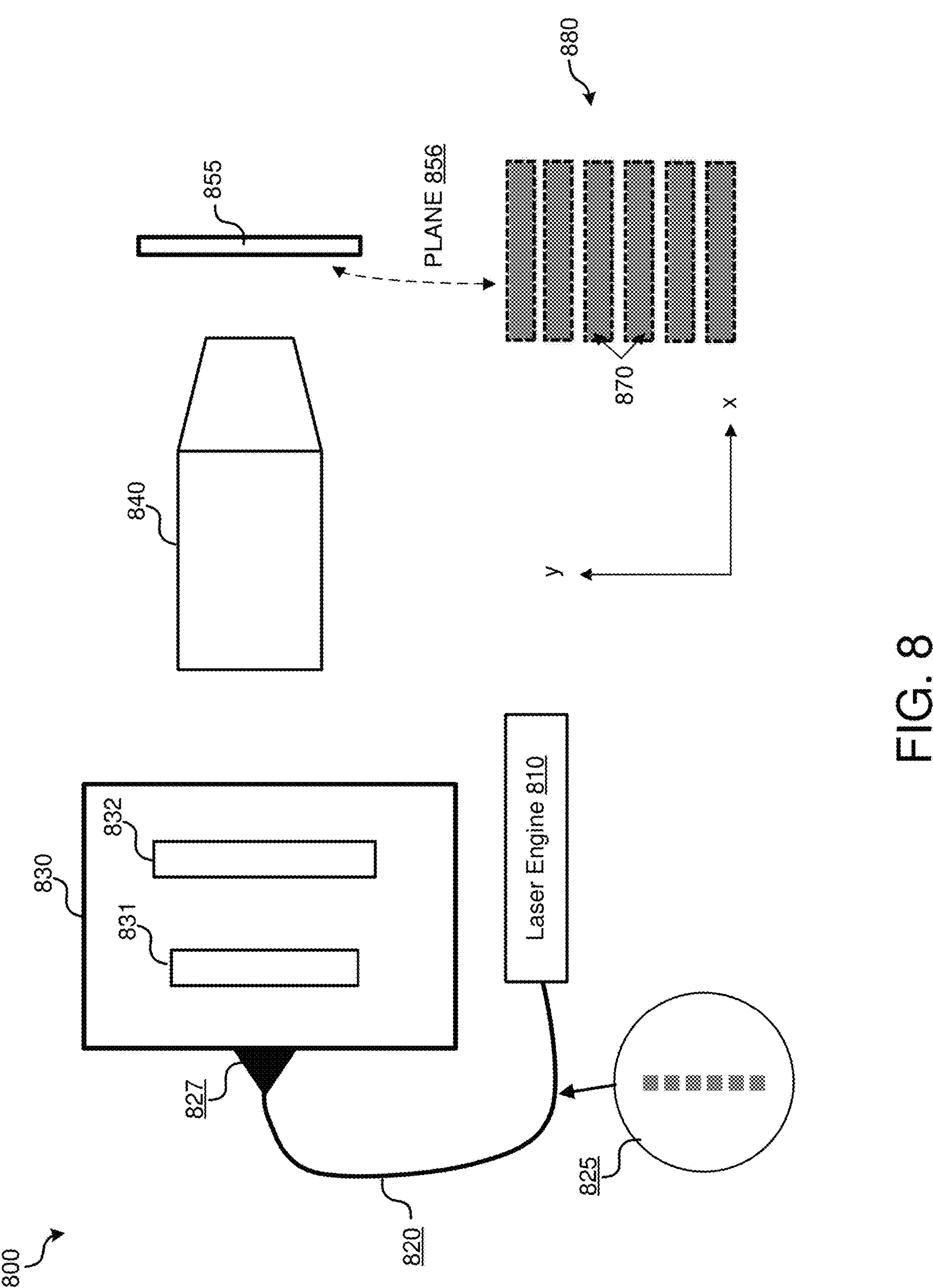
FIG. 8 is an optical diagram depicting an example optical configuration of a multi-band imaging system, in accordance with some implementations of the disclosure.

FIG. 8 is an optical diagram depicting an example optical configuration of a multi-band imaging system 800, in accordance with some implementations of the disclosure. For the sake of simplicity, some optical components of imaging system 800 may be omitted from FIG. 8. The multi-band imaging system 800 images a plane 856 of a sample 855 onto a TDI camera (not shown). The illumination 870 is shaped into rectangles matching the shape of the TDI sensors. The image 880 of the sensors is depicted by dashed rectangular lines.

During operation of multi-band imaging system 800, each sensor produces its own image of the sample, and a composite image (e.g., image 880) is formed from a combination of the images. In some implementations, the composite image can be formed by summing the images. In some implementations, prior to summing the images, one or more transformation operations can be applied to at least some of the images to align them. For example, each sensor image can be slightly different based on the specifications of the optical and motion control systems in the imager/sequencer. When the sample moves the distance between the first and last sensor, the sample can move slightly in X, producing a shifted image, or the relation of the sample to the pixels in the Y-direction might change. In such implementations, the differences in the images between the sensors can be simple shifts in X or Y, or could be slightly more complicated, requiring, for example, affine transformations, or distortion corrections.

Illumination 870 can be generated as follows. A laser engine 810 couples laser light into one end of fiber bundle 820 having multiple fiber cores. For example, a laser diode of laser engine 810 may generate the light. As depicted by cross section 825 of fiber bundle 820, the number of cores (6) in bundle 820 are matched to the number of sensors (6) in the TDI camera. Light beams coming from output 827 of bundle 820 are imaged onto the plane 856 of sample 855 to provide shaped illumination 870. As in the example of FIG. 7, the illuminated region of the sample 855 is matched to the region imaged by the TDI sensors, so that there is no or minimal unnecessary irradiation. As a result, illumination efficiency can be maximized while minimizing photobleaching and photodamage from unnecessary irradiation.

To shape the illumination 870, the light beams of fiber bundle output 827 pass through a collimator 830. The shaped light beams may then pass through objective 840. In this example, the collimator 830 is a cross cylindrical collimator including two acylindrical lenses 831, 832. The two acylindrical lenses can have different focal lengths, rotated 90 degrees to each other, to achieve independent magnification in the x and y axes. Acylindrical lens 831 can provide x-axis collimation with a focal length $f_x$, and acylindrical lens 82 can provide y-axis collimation with a focal length $f_y$, where $f_y > f_x$. In this example, by choosing a higher magnification for the x axis (shorter focal length), the six, square fiber cores are imaged as a series of rectangles rather than squares. These rectangles can be substantially matched to the shape of the TDI sensor array through appropriate choice of magnification in each axis and design of the fiber cores and spacing. For example, if objective 840 has a focal length of $f_o$, the magnification onto the sample in this example may be $M_x = f_o/f_x$, in the x axis, and $M_y = f_o/f_y$, in the y axis. In implementations where the fiber cores are not necessarily squares (e.g., they are rectangular), the fiber core aspect ratio can still be restricted, and relative lengthening of one of the axes as described above can still be implemented.

The use of independent magnification in the x and y axes as described in the foregoing example can be advantageous when considering fabrication tolerances of the fiber bundle, as it may be difficult or not feasible to stack the fiber cores too closely together in the y-direction. By virtue of applying a lower magnification in the y axis, the spacing of the illumination bands can be matched to the TDI sensor bands, without making the spacing of the fiber cores so small that they would be difficult, if not infeasible to fabricate. The x magnification can then be freely adjusted to fill the width of the bands. The fiber cores can be fabricated such that the ratio of the band height to inter-band distance is appreciably matched to the corresponding ratio in the dimensions of the multi-band TDI sensor.

In other implementations, other means may be used to shape the illumination 870. For example, in one implementation the fiber cores have rectangular cross sections that output light beams having a rectangular cross section. In some implementations, other beam shaping optics besides a cross cylindrical collimator may be utilized to generate laser lines. In some implementations multiple separate optical fibers (e.g., not part of an optical fiber bundle) may be utilized to generate multiple respective light beams.

Although system 800 is illustrated in this example as a single image sensor system, in other implementations, it may be implemented as a multi-image sensor system (e.g., by using two light sources that emit in two different wavelength ranges). Particular examples of multi-wavelength range imaging systems are further described below. Although, six spaced apart sensors are depicted in the foregoing examples, any camera having multiple bands of sensors with gaps between them may be utilized depending on the application.

As the foregoing example illustrates, the use of a fiber bundle can be effective in a multi-band TDI imaging system. In multi-band TDI, the laser excitation and imaging can be distributed over multiple lines/TDI bands such that the laser power density incident on the sample is reduced. This can improve imaging/sequencing quality, for example by reducing the effect of power density on DNA damage and phasing. Additionally, the fiber bundle application can provide a convenient, cost-effective route to generating a multi-line pattern required for multi-band TDI, which could easily be scaled to any reasonable number of TDI bands by changing the number of fiber cores in the bundle. The shape of the cores and the projection optics can also be varied to match the dimensions of the TDI bands. The use of a fiber stack can remove the need to use complex, bulky and expensive beam-shaping optics to generate the multi-line pattern, making multi-band TDI more feasible to implement.

In some implementations, the multi-band sensor described herein can be utilized in structured illumination imaging applications. In such applications, a grating or other light structuring optic(s) may need to be illuminated with the correct pattern (e.g., multi-line pattern). While this added complexity can make it challenging to generate the correct pattern, the use of an optical fiber bundle as described herein can provide a convenient and cost-effective solution to do so.

Figure 9:
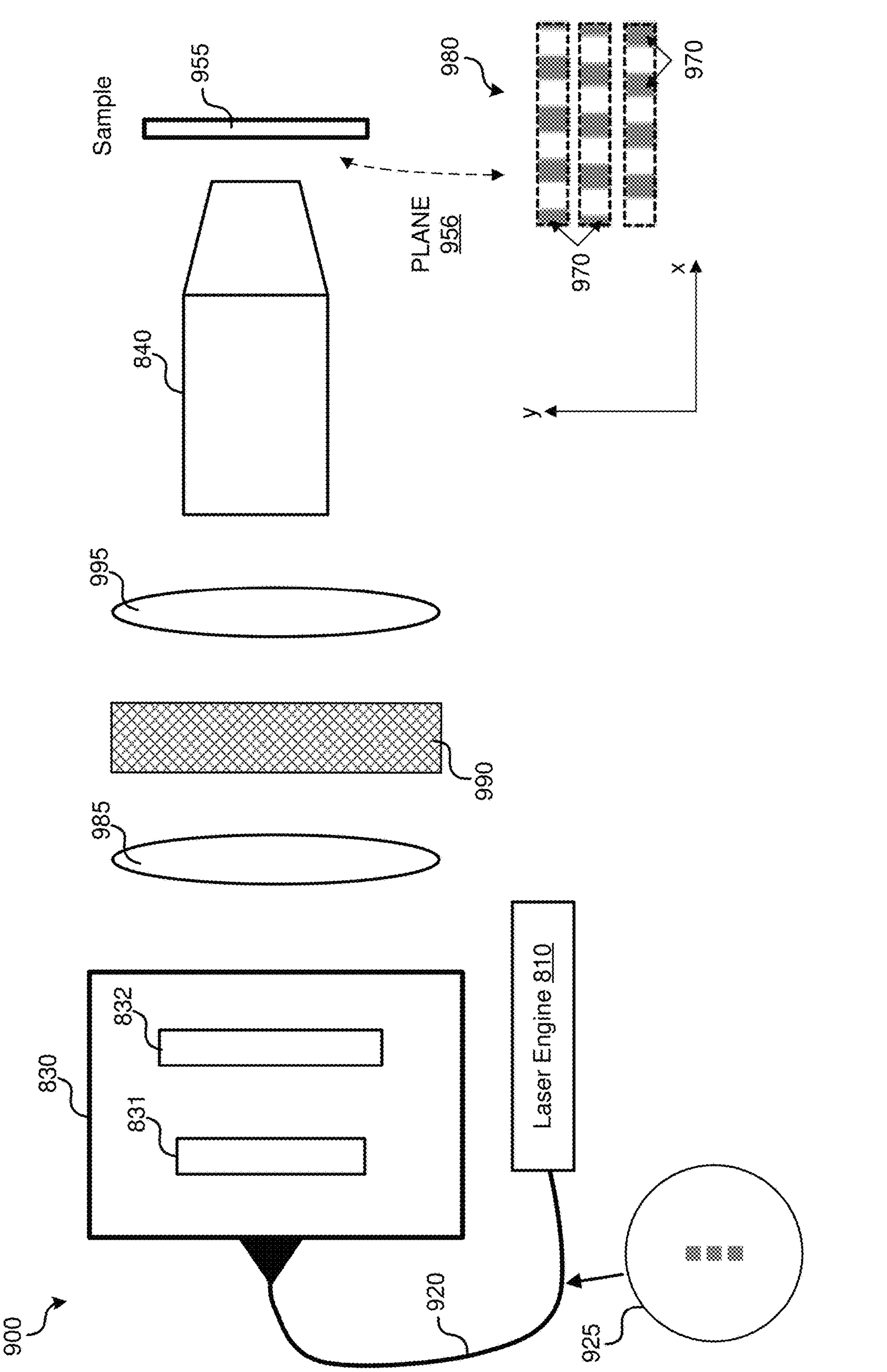
FIG. 9 is an optical diagram depicting an example optical configuration of a structured illumination imaging system, in accordance with some implementations of the disclosure.

FIG. 9 is an optical diagram depicting an example optical configuration of a structured illumination imaging system 900, in accordance with some implementations of the disclosure. For the sake of simplicity, some optical components of imaging system 900 may be omitted from FIG. 9. The structured illumination imaging system 900 images a plane 956 of a sample 955 onto a TDI camera (not shown). The illumination 970 is structured into rectangles/bands of fringes, the rectangles matching the shape of the TDI sensor. The image 980 of the sensor is depicted by dashed rectangular lines.

A laser engine 810 couples laser light into one end of fiber bundle 920 having multiple fiber cores. As depicted by cross section 925 of fiber bundle 920, the number of cores (3) in bundle 920 are matched to the number of sensors (3) in the TDI camera. To shape the output of fiber bundle 920 into lines, it passes through a collimator 830 as described above. It should be noted that the specific parameters (e.g., focal lengths of lenses) of collimator 830 may be adapted depending on the design of structured illumination imaging system 900.

In this example, the three cores of the laser-couped fiber bundle 920 are imaged onto a light structuring optical assembly 990, using the cross cylindrical collimator 830 and a fiber imaging lens 985 to obtain the correct multi-line pattern. The light structuring optical assembly 990 can be a diffraction grating (e.g., transmissive grating) or other beam splitting element such as a beam splitter cube or plate. The output of light structuring optical assembly 990, passes through a projection lens 995 and objective 840, and is imaged onto the plane 956 of sample 955 to generate an illumination 970 including three regions of illumination fringes that are matched to the three TDI sensors. Each of the regions of illumination fringes that is imaged can correspond to one of three phases used to reconstruct a high resolution, structured illumination image. Specific techniques for doing so are further described below.

Figure 10:
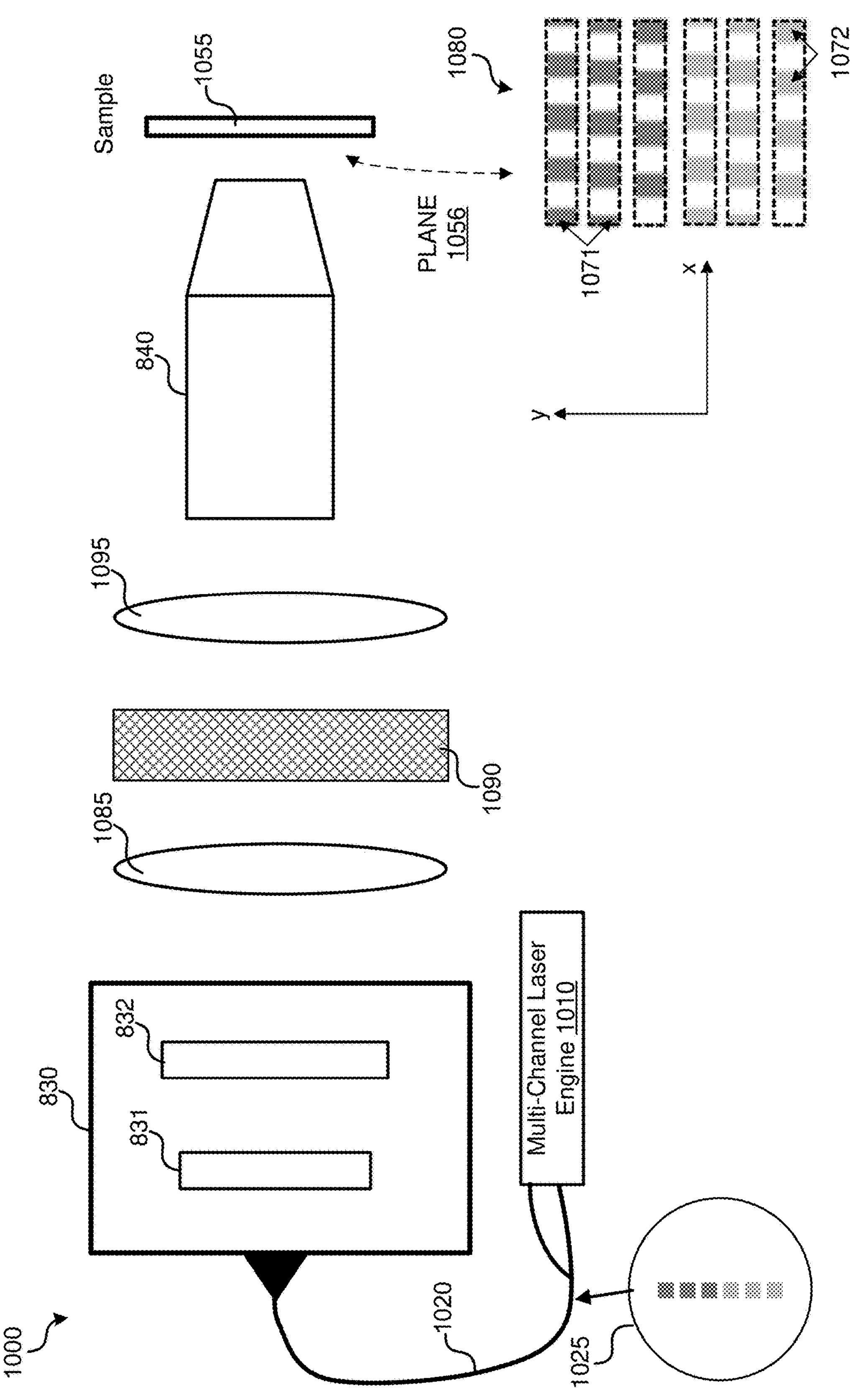
FIG. 10 is an optical diagram depicting an example optical configuration of a structured illumination imaging system for two-image sensor assembly imaging, in accordance with some implementations of the disclosure.

Although FIG. 9 depicts an example use of the fiber bundle with a single wavelength range sensor assembly structured illumination imaging system that uses a TDI camera with spaced sensors, the fiber bundle application could be extended to multi-wavelength range sensor assembly structured illumination imaging systems. For example, FIG. 10 is an optical diagram depicting an example optical configuration of a structured illumination imaging system 1000 for two-channel imaging, in accordance with some implementations of the disclosure. In this example, the two sensor assemblies can correspond to colors in two wavelength ranges in the visible color spectrum (e.g., in the blue and green wavelength ranges), and the imaging system 1000 can be utilized in an application such as SBS.

A multi-wavelength range sensor assembly laser engine 1010 can include a first laser (e.g., a laser configured to output excitation light in the first wavelength range) and a second laser (e.g., a laser configured to output excitation light in the second wavelength range) that can couple into two respective input ends of fiber bundle 1020. Each input end of the fiber bundle 1020 can include three fiber cores, which can then combine to form a six fiber core stack as depicted by cross section 1025 of fiber bundle 1020. In this example, the number of cores, six, in bundle 1020 are matched to the number of sensors, six, in the TDI camera. To shape the output of fiber bundle 1020 into lines (e.g., three for the first wavelength range and three for the second wavelength range), the fiber bundle 1020 outputs the excitation light through a collimator 830 as described above. It should be noted that the specific parameters (e.g., focal lengths of lenses) of collimator 830 may be adapted depending on the design of structured illumination imaging system 1000.

In this example, the six cores of the laser-couped fiber bundle 1020 are imaged onto a light structuring optical assembly 1090 (e.g., grating), using the cross cylindrical collimator 830 and a fiber imaging lens 1085 to obtain the correct multi-line pattern. The output of light structuring optical assembly 1090, passes through a projection lens 1095 and objective 840, and is imaged onto the plane 1056 of sample 1055 to generate an illumination including three regions of illumination fringes 1071 corresponding to a first wavelength range and three regions of illumination fringes 1072 corresponding to a second wavelength range. These six regions are matched to the six TDI sensors. Each set of three illumination fringes 1071, 1072 that is imaged can correspond to three phases used to reconstruct a high resolution, structured illumination image for a respective wavelength range image.

Figure 11:
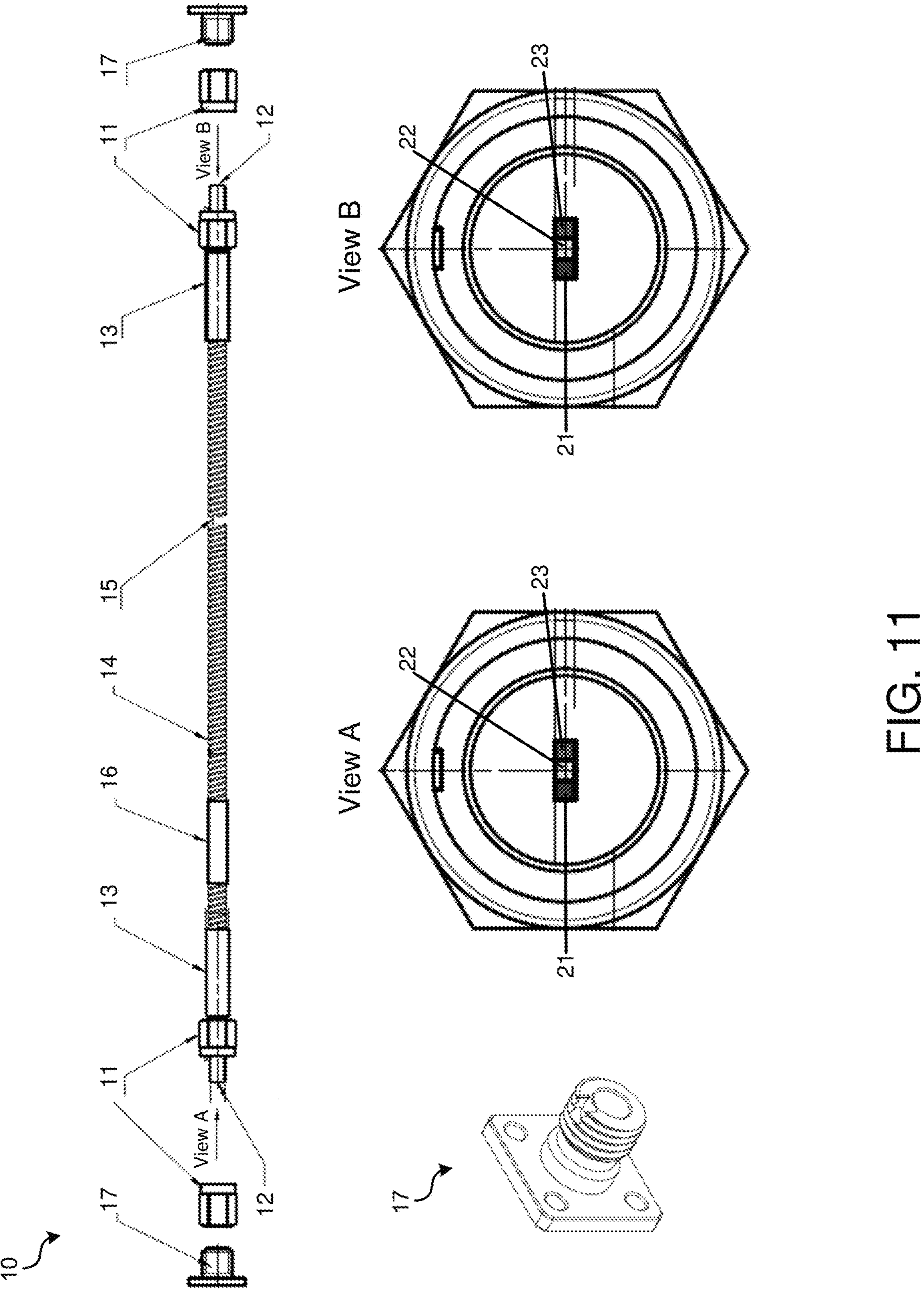
FIG. 11 depicts a 3-core fiber bundle that may be used in imaging systems, in accordance with some implementations of the disclosure.

FIG. 11 depicts a three core fiber bundle 10 that may be used in imaging systems, in accordance with some implementations of the disclosure. For example, bundle 10 may be utilized in structured illumination imaging system 900 described above. In this example, the fiber bundle 10 includes connectors 11, bolsters 12, bending protection 13, protection tube 14, stretching protection 15, label 16, and adapters 17 for connectors 11. As depicted by View A and View B of connectors 11, the bundle contains a stack of three square multimode fiber cores 21, 22, and 23. It should be appreciated that the position and number of the components of the optical fiber bundle may vary depending on the implementation. In some cases, certain components (e.g., bending protection 13, stretching protection 15, label 16, adapters 17, etc.) may be omitted.

Figure 12:
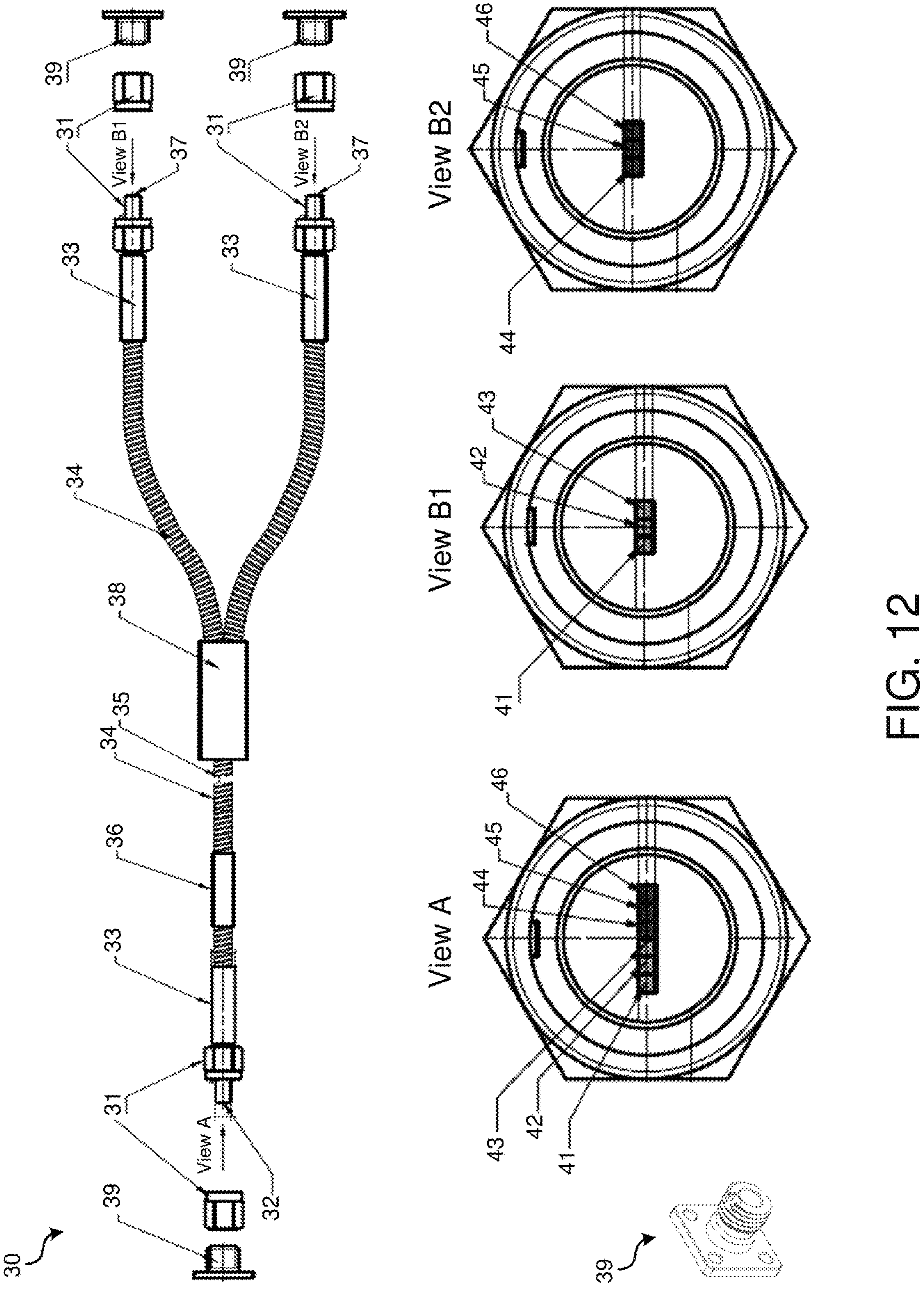
FIG. 12 depicts a 6-core fiber bundle that may be used in imaging systems, in accordance with some implementations of the disclosure.

FIG. 12 depicts a six core fiber bundle 30 that may be used in imaging systems, in accordance with some implementations of the disclosure. For example, bundle 30 may be utilized in the multi-sensor assembly structured illumination imaging system 1000 described above. In this example, the fiber bundle 30 includes connectors 31, bolsters 32 and 37, bending protection 33, protection tube 34, stretching protection 35, label 36, splitter/combiner 38 and adapters 39 for connectors 31. In this case, bundle 30 has two branches that can couple into respective laser inputs. As shown by Views B1 and B2 of connectors 31, one branch contains a stack of three square multimode fiber cores 41, 42, and 43, and other branch contains a stack of three square multimode fiber cores 44, 45, 46. Splitter/combiner 38 can combine the two branches form a six fiber core stack as shown by View A. It should be appreciated that the position and number of the components of the optical fiber bundle may vary depending on the implementation. In some cases, certain components (e.g., bending protection 33, stretching protection 35, label 36, adapters 39, etc.) may be omitted.

Figure 13:
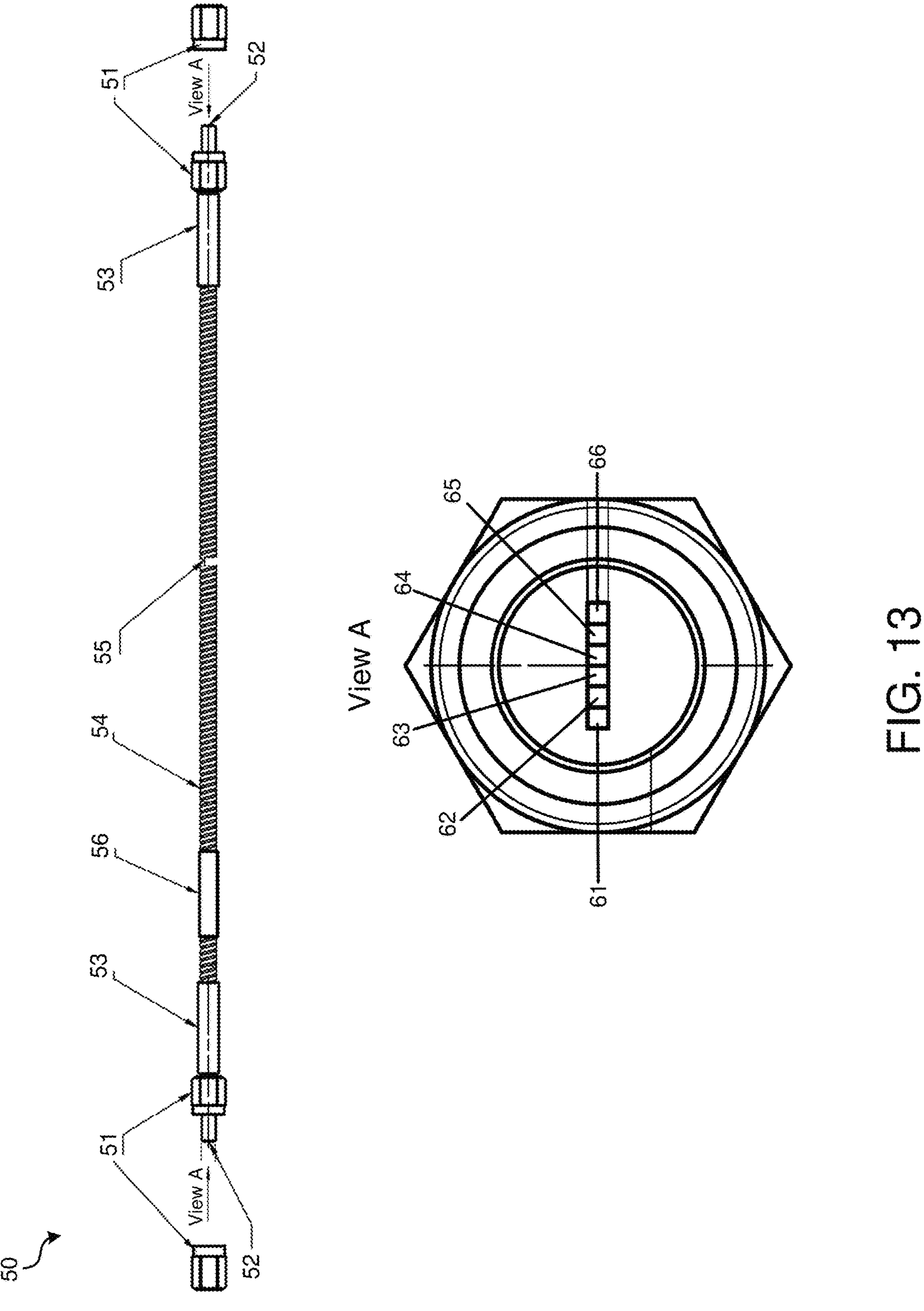
FIG. 13 depicts a 6-core fiber bundle that may be used in imaging systems, in accordance with some implementations of the disclosure.

FIG. 13 depicts a six core fiber bundle 50 that may be used in imaging systems, in accordance with some implementations of the disclosure. For example, bundle 50 may be utilized in structured illumination imaging system 800 described above. In this example, the fiber bundle 50 includes connectors 51, bolsters 52, bending protection 53, protection tube 54, stretching protection 55, and label 56. As depicted by View A of connectors 51, the bundle contains a stack of six square multimode fiber cores 61, 62, 63, 64, 65, and 66. It should be appreciated that the position and number of the components of the optical fiber bundle may vary depending on the implementation. In some cases, certain components (e.g., bending protection 53, stretching protection 55, label 56, etc.) may be omitted.

As described above, the multi-band TDI cameras may in some implementations be used in structured illumination imaging systems. Structured illumination microscopy (SIM) describes an imaging technique by which spatially structured (i.e., patterned) light may be used to image a sample in order to increase the lateral resolution of the microscope by a factor of two or more. During imaging of the sample, images of the sample may be acquired at various pattern phases (e.g., at 0°, 120°, and 240°), with the procedure being repeated by rotating the pattern orientation about the optical axis (e.g., by 60° and 120°). The captured images (e.g., nine images, one image for each orientation angle at each pattern phase) may be assembled into a single image having an extended spatial frequency bandwidth. The single image may be retransformed into real space to generate an image having a higher resolution than may normally be resolvable by the microscope.

In some implementations of SIM systems, a linearly polarized light beam is directed through an optical diffraction grating that diffracts the beam into two or more separate orders that may be projected on the imaged sample as a sinusoidal interference fringe pattern. In these implementations, the orientation of the projected optical diffraction grating pattern is controlled by rotating the optical diffraction grating about the optical axis, while the phase of the pattern is adjusted by moving the optical diffraction grating laterally across the axis. In such systems, the optical diffraction grating is mounted on a translation stage, which in turn is mounted on a rotation stage.

Some implementations described herein are directed to imaging biological samples configured to have square or asymmetrical patterns. For example, by configuring flow cells to have square or asymmetrical patterns (rather than hexagonal patterns, for example), fewer images are needed, as the resolution enhancement required to resolve the substrate becomes anisotropic, hence constructing an anisotropic optical transfer function (OTF) through using a more restricted SIM angle set becomes sufficient to resolve the substrate to sufficient degree. That is, flow cells having square or asymmetrical patterns of nanowells allow the axis/axes of a flow cell having a tighter pitch (i.e., the distance between immediately adjacent nanowells) and involving increased resolution, to be aligned with the axis/axes whose resolution is to be increased. In one example of a square patterned flow cell, increased resolution is only needed with respect to two axes. Thus, only six images are needed (an image at each of two angles across three phases). In the case of an asymmetrically patterned flow cell, only three images of a sample are needed to achieve increased resolution to fully resolve the features required for sequencing (an image at one angle across three phases).

With multi-angle SIM implementations, a fixed field of view is needed to acquire each of the angle/phase image combinations. However, when images are taken with respect to only a single angle, as is the case in implementations disclosed herein where an asymmetrically patterned flow cell is used as a sample substrate, TDI line scanning can be used to capture images of the sample covering the three SIM pattern phases. That is, a SIM pattern can be moved relative to the asymmetrically patterned flow cell to generate the three phases needed to resolve the sample in the flow cell with increased resolution along only one axis.

In some implementations, TDI line scanning can be used in conjunction with SIM techniques to image a sample by using a TDI line scanning camera or sensor to capture an image along a flow cell, i.e., a swath. That is, TDI line scanning can be performed on a flow cell patterned with a SIM pattern in a first phase. The SIM pattern can be shifted to a second phase, and TDI line scanning can be repeated. The SIM pattern can be shifted to a third phase, and TDI line scanning can be repeated again. In this way, images of the sample at each pattern phase are captured.

Alternatively, different portions of the flow cell can be patterned with different phases of the SIM pattern. For example, at a first portion of the flow cell, the SIM pattern can be located in a first position, at a second portion of the flow cell, the SIM pattern can be shifted to a second position, and at a third portion of the flow cell, the SIM pattern can be shifted to a third position. Thus, as the multiple sensors of the camera capture the swath, images of the sample across each of the three SIM pattern phases are captured in a single TDI line scan, e.g., by using the three sensors in the camera.

Some implementations of TDI line scanning may be implemented with a multi-band TDI camera as described above, where the three phases of a projected fringe pattern may be specified in one scan. Such implementations may be implemented using a three-part diffraction grating, where each part of the diffraction grating corresponds to a specific phase. For example, a three-element diffraction grating, with each element phase-stepped, may be formed on the same substrate. By virtue of this implementation, no movement of the grating or sample may be needed apart from movement along the scanning direction.

Use of a multi-part diffraction grating to generate multiple fringe phases can be suitable with some of the structured illumination imaging systems described above. For example, a three-part diffraction grating that generates three fringe phases can be used as part of the light structuring optical assembly 990, where each line of the fiber stack illumination illuminates one of the three parts of the grating. Similarly, a six-part diffraction grating that generates three fringe phases for each color/wavelength can be used as part of the light structuring optical assembly 1090. In that case, each line of the fiber stack illumination can illuminate one of the six parts of the grating.

In still other implementations, instead of shifting the SIM pattern relative to the sample/flow cell, the sample/flow cell is moved while the SIM pattern remains stationary. It is understood that the sample is located/placed in the flow cell resulting in the sample being patterned in accordance with the nanowells making up the flow cell. When implementing TDI line scanning, as noted above, the sample/flow cell is already moving. Hence, this movement of the sample/flow cell can be leveraged to avoid having to shift the SIM pattern. That is, the movement of the sample/flow cell relative to the stationary SIM pattern (given the appropriate orientation) generates the requisite phases needed to resolve the sample.

In some implementations, the grating and well pattern may be configured at a slight angular offset, with three thin illumination regions projected onto the sample, relatively far apart. Within each illumination line, wells may remain predominantly in phase with the grating, but the distance between the illumination regions may be sufficient that by the second illumination area they are lambda/3 out phase, for the phase shift. The spacing between the illumination lines in such implementations may make it easier to have a multi-band TDI camera with multiple image sensors (e.g., three) next to each other.

Figures 14A, 14B, 14C:
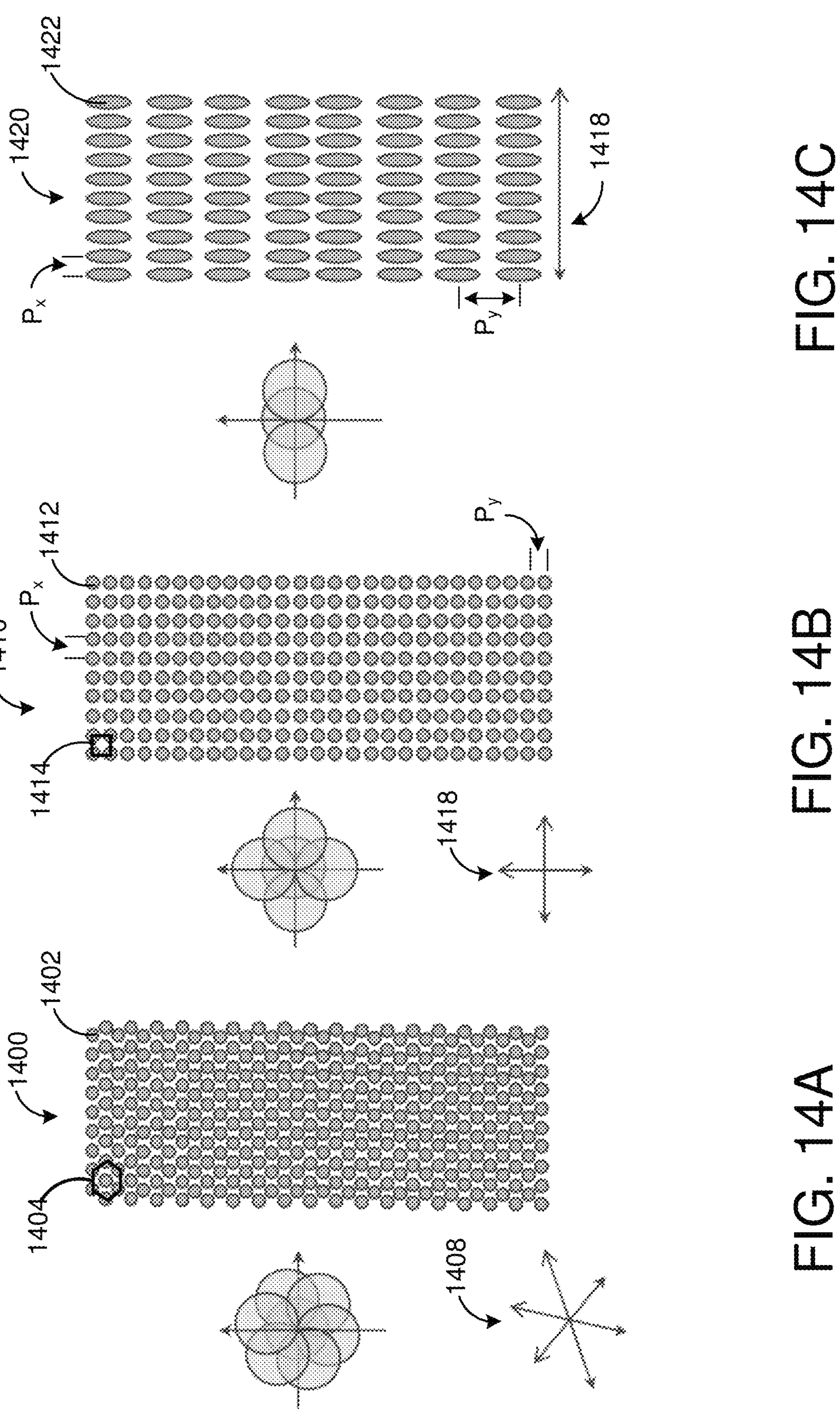
FIG. 14A illustrates an example of a hexagonal flow cell pattern.
FIG. 14B illustrates an example of a square array flow cell pattern, the use of which results in reduced dimensionality structured illumination imaging.
FIG. 14C illustrates an example of an asymmetrical array flow cell pattern, the use of which results in reduced dimensionality structured illumination imaging.

FIG. 14A illustrates an example configuration of a patterned flow cell 1400 that may be imaged in accordance with implementations disclosed herein. In this example, flow cell 1400 is patterned with a hexagonal array (see 1404) of ordered spots or features 1402 that may be simultaneously imaged during an imaging run. For ease of illustration, flow cell 1400 is illustrated as having tens to hundreds of spots 1402. However, as can be appreciated by one having skill in the art, flow cell 1400 may have thousands, millions, or billions of spots 1402 that are imaged.

As alluded to above, in some examples in order to resolve a sample using patterned flow cell 1400, at least nine images are needed to achieve the requisite resolution. This is because the hexagonal array of nanowells in patterned flow cell 1400 is a high frequency pattern, where the pitch between nanowells is tight, and unresolvable. In particular, in this example there are two factors that can determine how many images are needed to sufficiently resolve a sample. The first factor is the number copies of the optical passband that are desired. The second factor is the number of images used to demodulate phases for each optical passband. Although theoretically, only two images are needed (to obtain the real and imaginary parts), three images are typically used to obtain better noise averaging.

It should be understood that when translating an image from spatial frequency to Fourier space (analysis of raw data generated by a microscope at the objective rear focal plane is based on Fourier analysis), the Fourier transform contains 3 components or axes. That is, the diffraction of light at the objective rear focal plane can create a diffraction barrier that dictates a maximum resolution of approximately 200 nm in the lateral (x,y) dimension and 500 nm in the axial (z) dimension, depending upon the objective numerical aperture and the average wavelength of illumination. Accordingly, when using the hexagonal array of nanowells in patterned flow cell 1400 images are taken at three angles using SIM. As also discussed above, in order to obtain the requisite resolution, images must be taken across three phases at each of the three angles, where the three phases are needed to ensure all parts on imaging area are observed (i.e., to cover an entire wavelength of the SIM pattern), thereby resulting in nine images. This results in increased resolution in all three axes 1408.

However, in one example, using another type of patterned flow cell, e.g., a flow cell 1410 as illustrated by FIG. 14B, where nanowells 1412 are patterned onto a square array (see 1414), only two angles are needed to achieve increased resolution, the increased resolution being aligned along the axes of the square array. A square patterned flow cell, such as flow cell 1410 can be resolved by aligning the SIM pattern or fringe to those directions in which an increase in resolution is desired, in this case, along the two axes (x and y) of the square array. It can be appreciated that along any diagonal path between neighboring nanowells 1412, there will be some resolution enhancement so that diagonally neighboring nanowells will be resolvable from one another. However, between nanowells 1412 along the x and y axes, the pitch ($P_x$, $P_y$) is narrow enough that resolution needs to be boosted using SIM, i.e., the spatial frequency in the x and y axes is too high to be resolved.

By using a square patterned flow cell, such as flow cell 1410, the dimensionality requirement of conventional sequencing systems using SIM can be reduced by one dimension, where resolution is increased in only two axes 1418. That is, rather than capture nine images that cover three angles over three phases each, only six images that cover two angles over three phases each need to be captured in order to adequately resolve a sample contained within flow cell 1410. This is advantageous despite a reduction in packing density of flow cell 1410. For example, reduction in packing density may be only 11% over a hexagonal array having the same pitch. However, implementing SIM in accordance with various examples can result in a packing density increase of, e.g., 356% for a square patterned array with a 350 nm pitch, over a non-SIM hexagonal array with a 700 nm pitch.

By using still another type of patterned flow cell, in this example an asymmetrically patterned flow cell, the dimensionality requirement of conventional sequencing systems using SIM can be reduced by yet one more dimension. FIG. 14C illustrates a patterned flow cell 1420 whose nanowells are patterned asymmetrically. In this implementation, each nanowell 1422 is shaped or configured to form an elongated structure. As utilized herein, the term elongated structure refers to a shape where the dimension along a first axis is greater that the dimensions along a second axis. In this example, the x axis, is narrower than the length or height of nanowell 1422 along another axis (in this example, the y axis). It should be understood that although the implementation illustrated in FIG. 14C uses elliptical nanowells, other types of elongated nanowells, e.g., rectangles, may be used. Any shape of nanowell may be used that results in a pattern whereby the sample along only one axis is associated with a resolution increase using SIM. In some implementations, the dimension of the patterned features that the fringe width w is at least substantially the same as or slightly greater than may be a diameter of a circular feature, a length of a side of a square feature, a length of the longer side or shorter side of a rectangular feature, a diameter of an elliptical feature along its major axis or minor axis, or the longest dimension of an irregularly shaped feature along one axis of the feature (e.g., x or y axis). In some implementations, the nanowells may alternatively be shaped as squares or circles, but with asymmetric spacing therebetween. In various implementations, an asymmetrically patterned flow cell may refer to an array in which the primary frequency components are at different distances from the zero frequency component, an array whose unit cell may be defined by a variety of pitches, or an array in which the frequency components of the array may be resolved by an optical transfer function which is more asymmetric that the traditional 3-angle SIM OTF.

In this way, the sample can be resolved along one direction or axis, i.e., the y axis, while along another direction or axis, i.e., the x axis, SIM is used to increase resolution in order to resolve the sample. That is, along the x axis, the pitch, $P_x$, of asymmetrically patterned flow cell 1420 is narrow or tight, entailing an increase in resolution, while along the y axis, the pitch, $P_y$, of asymmetrically patterned flow 1420 is larger. Accordingly, resolution is increased in only one direction/along one axis 1418, and only three images are captured in order to adequately resolve a sample contained within the nanowells of flow cell 1420. Thus, only one copy of the optical passband is created and needed to increase resolution.

Figure 15:
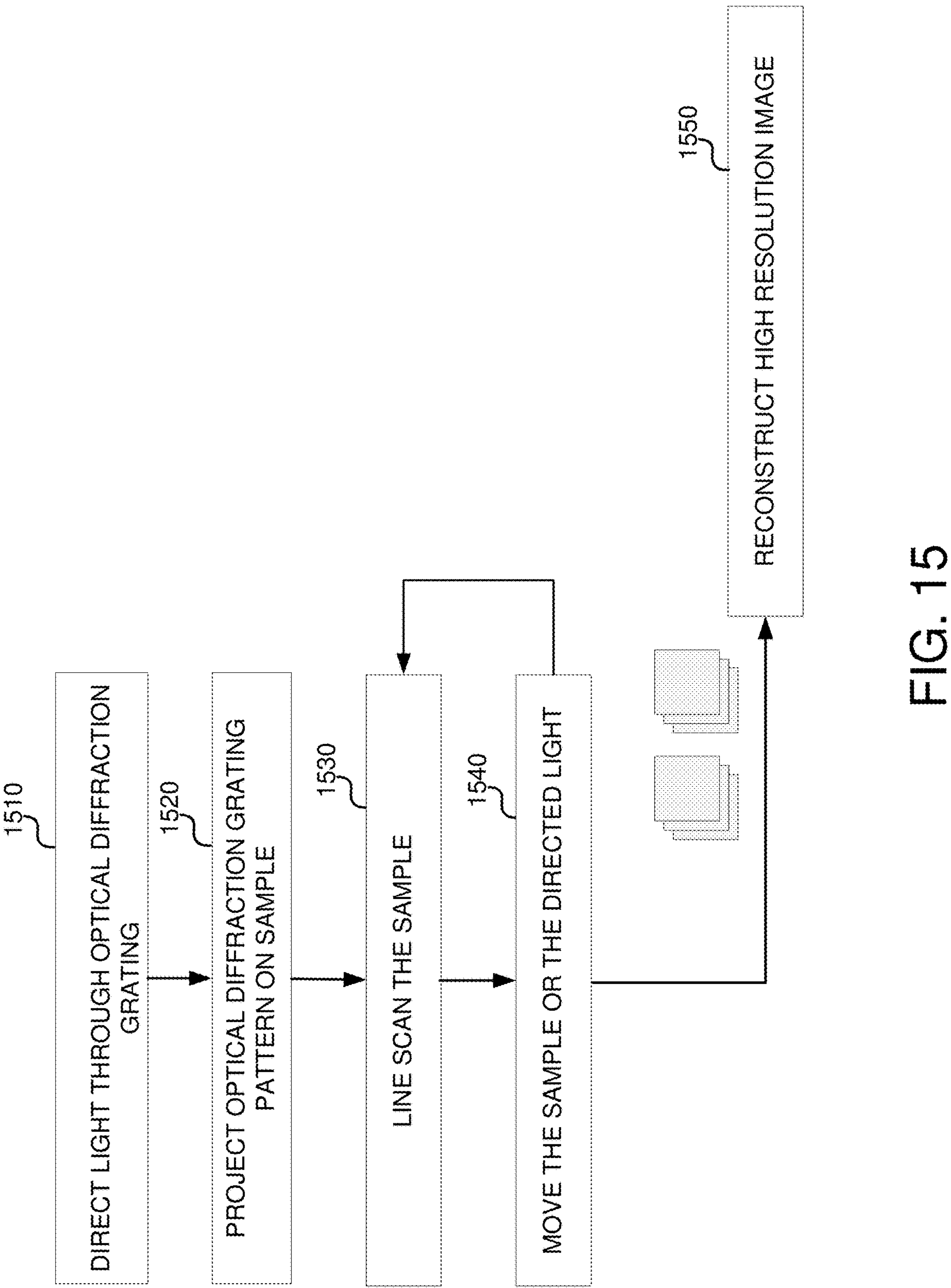
FIG. 15 is a flow chart illustrating example operations that may be implemented for reduced dimensionality structured illumination imaging used in conjunction with line scanning imaging, in accordance with some implementations of the disclosure.

FIG. 15 is a flow chart illustrating example operations that can be performed in a line scanning imaging system, to sequence a sample using an asymmetrically patterned flow cell such as flow cell 1420. Depending on whether the method is implemented with a single image sensor assembly or multi-image sensor assembly line scanning imaging system, one or more laser light sources may be turned on. At operation 1510, light beams from laser source(s), are output through a stationary optical diffraction grating corresponding to an optical diffraction grating pattern orientation. The stationary optical diffraction grating can be a multi-part diffraction grating that generates multiple respective fringe phases (e.g., three phases for three lines in a single image sensor assembly system, or six phases for six lines in a two-image sensor assembly system). The one or more laser light sources can couple into a fiber bundle (e.g., 920, 1020, etc.) as described above, and the light beams can pass through a collimator (e.g., collimator 830) prior to being output through the stationary optical diffraction grating.

At operation 1520, the optical diffraction grating pattern is projected onto a sample, and at operation 1530, the sample is line scanned. At operation 1540, the sample is moved in accordance with the aforementioned line scanning techniques or the directed light may be moved as also described above to achieve relative motion between the sample and optical diffraction grating pattern.

Operations 1530 and 1540 may be repeated as many times as necessary to capture images representative of the entire sample. As a result of the sample being moved relative to the stationary optical diffraction grating pattern, images of the sample and optical diffraction grating pattern can be captured across the requisite phase shifts needed to increase resolution. At operation 1550, a high resolution image can be reconstructed. For a given image sensor assembly, a high resolution image can be reconstructed using only three captured images (e.g., three images captured by three sensors of a TDI camera).

It should be noted that in order to prevent motion blur between the optical diffraction grating pattern and the sample during line scanning, the laser source(s) can operate in a pulsed fashion. That is, the laser source(s), may be pulsed so that at every excitation, a line scanning image can be captured. In some implementations, the orientation of the optical diffraction grating pattern relative to the sample/flow cell can be shifted by 90°. In other implementations, if the orientation of the optical diffraction grating pattern is such that the sample is not moving through areas of light and dark (as may be the case if the orientation of the optical diffraction grating pattern was shifted by 90°), pulsing of the laser source(s) may not be needed because movement of the sample relative to the optical diffraction grating pattern moves through the same fringe intensity.

It should be noted that, although implementations described herein have been primarily described in the context of using diffraction gratings to create fringe patterns that are projected onto an imaged sample, in implementations the projected fringe patterns need not necessarily be created by diffraction gratings. Any method of creating a sinusoidal fringe pattern may be suitable. Creation of a fringe pattern may be achieved via interference between two counter propagating beams, mutually coherent at the point of the desired interference pattern; via coherent or incoherent imaging of a diffraction grating; via beams separated via a beam splitter and interfered; counter propagating beams in a light-pipe or waveguide, etc.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

It should be appreciated that all combinations of the foregoing concepts (provided such concepts are not mutually inconsistent) are contemplated as being part of the inventive subject matter disclosed herein. In particular, all combinations of claimed subject matter appearing in this disclosure are contemplated as being part of the inventive subject matter disclosed herein.

What is claimed is:

1. An imaging system comprising:

a camera including multiple image sensors that are spaced apart, each of the image sensors to capture an image of a respective sample location of multiple sample locations of a sample;

a fiber bundle comprising multiple fiber cores, each of the fiber cores to emit a light beam that is projected on a respective one of the sample locations; and one or more beam shaping optics positioned in an optical path between an output of the fiber bundle and the sample, the one or more beam shaping optics to shape the light beams into shapes that correspond to shapes of the sample locations and shapes of the image sensors, and the one or more beam shaping optics to shape the light beams in a first axis and a second axis orthogonal to the first axis.

2. The imaging system of claim 1, wherein: each of the image sensors is rectangular; and the one or more beam shaping optics comprise a collimator to shape the light beams into illumination lines.

3. The imaging system of claim 2 wherein the collimator comprises:

a first acylindrical lens to shape the light beams in the first axis, the first acylindrical lens having a first focal length; and a second acylindrical lens to shape the light beams in the second axis orthogonal to the first axis, the second acylindrical lens having a second focal length different from the first focal length.

4. The imaging system of claim 3, wherein each of the fiber cores is square.

5. The imaging system of claim 2, wherein the camera is a time delay integration (TDI) camera.

6. The imaging system of claim 2, wherein the one or more beam shaping optics further comprise an objective to focus the light beams, the objective positioned in an optical path between the collimator and the sample.

7. The imaging system of claim 1, wherein:

the imaging system is a structured illumination imaging system; and the imaging system further comprises a light structuring optical assembly to structure each of the light beams such that each of the light beams projected on the sample locations comprises a plurality of fringes.

8. The imaging system of claim 7, wherein the light structuring optical assembly comprises:

a diffraction grating; and a grating projection lens positioned in an optical path between the diffraction grating and the sample.

9. The imaging system of claim 8, wherein the sample is asymmetrically patterned, and the diffraction grating comprises multiple parts.

10. The imaging system of claim 7, further comprising: a processor to reconstruct, based on the images captured by the image sensors, an image having a higher resolution than each of the images captured by the sensors.

11. The imaging system of claim 10, wherein the images captured by the image sensors comprise multiple phase images.

12. The imaging system of claim 1, wherein the number of the fiber cores is the same as the number of the image sensors.

13. The imaging system of claim 1, wherein the multiple fiber cores comprise:

a first plurality of fiber cores to emit light beams having a first wavelength; and a second plurality of fiber cores to emit light beams having a second wavelength.

14. The imaging system of claim 13, wherein the fiber bundle comprises:

a first branch including the first plurality of fiber cores, the first branch to couple to a first light source that emits light in the first wavelength; and a second branch including the second plurality of fiber cores, the second branch to couple to a second light source that emits light in the second wavelength.

15. The imaging system of claim 1, wherein:

the camera is a time delay integration (TDI) camera;

the multiple image sensors are spaced apart along a scanning direction of the imaging system; and the one or more beam shaping optics are to shape the light beams into multiple lines having shapes that correspond to the shapes of the sample locations and the shapes of the image sensors, each of the lines projected on a respective one of the sample locations.

16. The imaging system of claim 1, wherein:

the multiple image sensors are multiple TDI image sensors that are spaced apart; and the imaging system further comprises the sample, wherein the sample comprises a plurality of nucleic acids to be analyzed, and the multiple TDI image sensors enable a lower power density for imaging than would be required with a single sensor.

17. The imaging system of claim 16, further comprising an asymmetrically patterned flowcell including the sample.

18. The imaging system of claim 16, further comprising: a processor to form a composite image of the images captured by the multiple TDI image sensors.

19. The imaging system of claim 18, wherein prior to forming the composite image, the processor is to align the images.

20. The imaging system of claim 1, wherein:

the sample is a nucleic acid sample; and the imaging system is a sequencing system configured to perform sequencing of the nucleic acid sample.

21. The imaging system of claim 20, wherein the nucleic acid sample is disposed on a patterned flow cell.

22. The imaging system of claim 1, wherein the one or more beam shaping optics are to shape a first light beam of the light beams into a shape that corresponds to a shape of a first sample location of the multiple sample locations and a shape of a first image sensor of the multiple image sensors, and to shape a second light beam of the light beams into a shape that corresponds to a shape of a second sample location of the multiple sample locations and a shape of a second image sensor of the multiple image sensors.

* * * * *